(12) United States Patent
Mani Iyer Ramani et al.

(10) Patent No.: US 12,547,163 B2
(45) Date of Patent: Feb. 10, 2026

(54) ANOMALY DETECTION SYSTEM AND METHOD USING INVARIANTS FOR AN INDUSTRIAL CONTROL SYSTEM

(71) Applicant: Singapore University of Technology and Design, Singapore (SG)

(72) Inventors: Gauthama Raman Mani Iyer Ramani, Singapore (SG); Aditya Mathur, Singapore (SG)

(73) Assignee: Singapore University of Technology and Design, Singapore (SG)

( * ) Notice: Subject to any disclaimer, the term of this patent is extended or adjusted under 35 U.S.C. 154(b) by 497 days.

(21) Appl. No.: 17/761,991

(22) PCT Filed: Feb. 4, 2022

(86) PCT No.: PCT/SG2022/050052
§ 371 (c)(1),
(2) Date: Mar. 18, 2022

(87) PCT Pub. No.: WO2022/169420
PCT Pub. Date: Aug. 11, 2022

(65) Prior Publication Data
US 2024/0045410 A1    Feb. 8, 2024

(30) Foreign Application Priority Data
Feb. 5, 2021 (SG) .............. 10202101249T

(51) Int. Cl.
*G05B 23/02* (2006.01)
(52) U.S. Cl.
CPC ..... *G05B 23/0221* (2013.01); *G05B 23/0248* (2013.01); *G05B 23/0254* (2013.01)
(58) Field of Classification Search
None
See application file for complete search history.

(56) References Cited

U.S. PATENT DOCUMENTS 5,847,952 A * 12/1998 Samad ................ G05B 13/027
700/48
10,911,482 B2   2/2021 Mathur et al.
(Continued)

FOREIGN PATENT DOCUMENTS

CN    109361648 A    2/2019
CN    111262722 A    6/2020
(Continued)

OTHER PUBLICATIONS

Foreign Communication from a Related Counterpart Application, International Search Report and Written Opinion dated Apr. 14, 2022, International Application No. PCT/SG2022/050052 filed on Feb. 4, 2022.

(Continued)

*Primary Examiner* — Bernard G Lindsay
(74) *Attorney, Agent, or Firm* — Conley Rose, P.C.

(57) ABSTRACT

An anomaly detection method includes determining state variables of an industrial control system based on a system design of the industrial control system; determining invariants governing the state variables based on the system design; receiving historical measurement data of the state variables of each invariant from the industrial control system; constructing a set of behavioural models for each invariant using a set of machine learning algorithms and the historical measurement data of the respective state variables, the behavioural models representing normal behaviour of the respective state variables; predicting measurement data of the state variables of each invariant using the behavioural models and the historical measurement data of the respective state variables; receiving current measurement data of the state variables during operation of the industrial control system; and detecting the anomalies based on deviations (Continued)

between the current measurement data and predicted measurement data of the state variables of each invariant.

18 Claims, 15 Drawing Sheets

(56) References Cited

U.S. PATENT DOCUMENTS

| | | | | |
|---|---|---|---|---|
| 11,373,117 | B1* | 6/2022 | Cui | G06F 16/285 |
| 11,385,673 | B1* | 7/2022 | Ellis | G06F 18/22 |
| 11,966,930 | B1* | 4/2024 | Posert | G06N 3/088 |
| 2013/0145219 | A1* | 6/2013 | Dalal | G06F 11/0748 714/47.1 |
| 2013/0211546 | A1* | 8/2013 | Lawson | H04L 67/02 700/9 |
| 2014/0250153 | A1* | 9/2014 | Nixon | G06F 16/22 707/812 |
| 2014/0282257 | A1* | 9/2014 | Nixon | G05B 15/02 715/835 |
| 2015/0199224 | A1* | 7/2015 | Mihnev | G06F 11/0751 714/37 |
| 2016/0330225 | A1 | 11/2016 | Kroyzer et al. | |
| 2016/0337289 | A1* | 11/2016 | Duca | H04L 12/1895 |
| 2018/0087790 | A1* | 3/2018 | Perez | F24F 11/52 |
| 2018/0157933 | A1* | 6/2018 | Brauer | G06F 18/24143 |
| 2019/0093187 | A1* | 3/2019 | Lee | G06N 3/08 |
| 2019/0113549 | A1* | 4/2019 | Nakayama | G01R 22/066 |
| 2019/0253440 | A1* | 8/2019 | Mathur | G06F 21/554 |
| 2020/0394892 | A1 | 12/2020 | Zhao | |
| 2021/0092098 | A1* | 3/2021 | Birk | G05B 19/058 |
| 2021/0226862 | A1* | 7/2021 | Oba | H04L 43/02 |
| 2021/0304123 | A1* | 9/2021 | Vanapalli | G06V 10/774 |
| 2021/0396730 | A1* | 12/2021 | Zhang | G01N 33/14 |
| 2022/0276400 | A1* | 9/2022 | Kuwamori | G01V 1/137 |
| 2024/0036532 | A1* | 2/2024 | Jahanshahi | G05B 17/02 |

FOREIGN PATENT DOCUMENTS

| | | |
|---|---|---|
| CN | 111698267 A | 9/2020 |
| WO | 2020231334 A1 | 11/2020 |

OTHER PUBLICATIONS

Marshall Abrams and JoeWeiss. Malicious control system cyber security attack case study-maroochy water services, australia. McLean, VA: The MITRE Corporation, 2008.

Sridhar Adepu and Aditya Mathur. An investigation into the response of a water treatment system to cyber attacks. In Proceedings of the 2016 IEEE 17th International Symposium on High Assurance Systems Engineering (HASE), HASE 16, p. 141-148, USA, 2016. IEEE Computer Society.

Sridhar Adepu and Aditya Mathur. Assessing the effectiveness of attack detection at a hackfest on industrial control systems. IEEE Transactions on Sustainable Computing, 2018.

Sridhar Adepu and Aditya Mathur. Distributed attack detection in a water treatment plant: Method and case study. IEEE Transactions on Dependable and Secure Computing, pp. 1-1, Oct. 2018.

Sridhar Adepu and Aditya P Mathur. Detecting multi-point attacks in a water treatment system using intermittent control actions. In SG-CRC, pp. 59-74, 2016.

Chuadhry Mujeeb Ahmed, Gauthama Raman MR, and Aditya P Mathur. Challenges in machine learning based approaches for real-time anomaly detection in industrial control systems. In Proceedings of the 6th ACM on Cyber- Physical System Security Workshop, pp. 23-29, 2020.

Alvaro A C'ardenas, Saurabh Amin, Zong-Syun Lin, Yu-Lun Huang, Chi-Yen Huang, and Shankar Sastry. Attacks against process control systems: risk assessment, detection, and response. In Proceedings of the 6th ACM symposium on information, computer and communications security, pp. 355-366, 2011.

Tanmoy Kanti Das, Sridhar Adepu, and Jianying Zhou. Anomaly detection in industrial control systems using logical analysis of data. Computers & Security, 96:101935, 2020.

Dorothy E Denning. An intrusion detection model. IEEE Transactions on software engineering, (2):222-232, 1987.

Cheng Feng, Venkata Reddy Palleti, Aditya Mathur, and Deeph Chana. A systematic framework to generate invariants for anomaly detection in industrial control systems. In NDSS, pp. 1-15, 2019.

Pavel Filonov, Fedor Kitashov, and Andrey Lavrentyev. Rnn-based early cyber-attack detection for the tennessee eastman process. arXiv preprint arXiv:1709.02232, 2017.

Pavel Filonov, Andrey Lavrentyev, and Artem Vorontsov. Multivariate industrial time series with cyber-attack simulation: Fault detection using an lstm-based predictive data model. arXiv preprint arXiv:1612.06676, 2016.

M.R. Gauthama Raman, Wenjie Dong, and Aditya Mathur. Deep autoencoders as anomaly detectors: Method and case study in a distributed water treatment plant. Computers & Security, 99:102055, 2020.

Jonathan Goh, Sridhar Adepu, Khurum Nazir Junejo, and Aditya Mathur. A dataset to support research in the design of secure water treatment systems. In International Conference on Critical Information Infrastructures Security, pp. 88-99. Springer, 2016.

Jonathan Goh, Sridhar Adepu, Marcus Tan, and Zi Shan Lee. Anomaly detection in cyber physical systems using recurrent neural networks. In 2017 IEEE 18th International Symposium on High Assurance Systems Engineering (HASE), pp. 140-145. IEEE, 2017.

Yan Hu, Hong Li, Tom H. Luan, An Yang, Limin Sun, Zhiliang Wang, and Rui Wang. Detecting stealthy attacks on industrial control systems using a permutation entropy-based method. Future Generation Computer Systems, 108:1230-1240, 2020.

Yan Hu, Hong Li, Hong Yang, Yuyan Sun, Limin Sun, and Zhiliang Wang. Detecting stealthy attacks against industrial control systems based on residual skewness analysis. EURASIP Journal on Wireless Communications and Networking, 2019(1):74, 2019.

Jun Inoue, Yoriyuki Yamagata, Yuqi Chen, Christopher M Poskitt, and Jun Sun. Anomaly detection for a water treatment system using unsupervised machine learning. In 2017 IEEE international conference on data mining workshops (ICDMW), pp. 1058-1065. IEEE, 2017.

Trust. Fourth International Security Showdown Online 2020. Technical report, iTrust, Center for Research in Cyber Security, Singapore University of Technology and Design, 2020.

Khurum Nazir Junejo and Jonathan Goh. Behaviour-based attack detection and classification in cyber physical systems using machine learning. In Proceedings of the 2nd ACM International Workshop on Cyber-Physical System Security, pp. 34-43, 2016.

Moshe Kravchik and Asaf Shabtai. Detecting cyber attacks in industrial control systems using convolutional neural networks. In Proceedings of the 2018 Workshop on Cyber-Physical Systems Security and Privacy, pp. 72-83, 2018.

Moshe Kravchik and Asaf Shabtai. Efficient cyber attacks detection in industrial control systems using lightweight neural networks and pca, 2019.

Dan Li, Dacheng Chen, Jonathan Goh, and See-kiong Ng. Anomaly detection with generative adversarial networks for multivariate time series. arXiv preprint arXiv:1809.04758, 2018.

Weixin Li, Vijay Mahadevan, and Nuno Vasconcelos. Anomaly detection and localization in crowded scenes. IEEE transactions on pattern analysis and machine intelligence, 36(1):18-32, 2013.

Qin Lin, Sridha Adepu, Sicco Verwer, and Aditya Mathur. Tabor: A graphical model-based approach for anomaly detection in industrial control systems. In Proceedings of the 2018 on Asia Conference on Computer and Communications Security, ASIACCS '18, p. 525-536, New York, NY, USA, 2018. Association for Computing Machinery.

Robert Lipovsky. New wave of cyberattacks against ukrainian power industry. We Live Security, 2016.

Eric Luiijf. Threats in industrial control systems. In Cyber-security of SCADA and Other Industrial Control Systems, pp. 69-93. Springer, 2016.

MR Gauthama Raman, Nivethitha Somu, and Aditya P Mathur. Anomaly detection in critical infrastructure using probabilistic

(56) References Cited

OTHER PUBLICATIONS neural network. In International Conference on Applications and Techniques in Information Security, pp. 129-141. Springer, 2019.

Gauthama Raman MR, Nivethitha Somu, and A.P. Mathur. A multilayer perceptron model for anomaly detection in water treatment plants. International Journal of Critical Infrastructure Protection, 31:100393, 2020.

Dmitry Shalyga, Pavel Filonov, and Andrey Lavrentyev. Anomaly detection for water treatment system based on neural network with automatic architecture optimization. arXiv preprint arXiv:1807.07282, 2018.

Keith Stouffer, Joe Falco, and Karen Scarfone. Guide to industrial control systems (ics) security. NIST special publication, 800(82):16-16, 2011.

Muhammad Azmi Umer, Aditya Mathur, Khurum Nazir Junejo, and Sridhar Adepu. Generating invariants using design and data-centric approaches for distributed attack detection. International Journal of Critical Infrastructure Protection, 28:100341, 2020.

David I. Urbina, Jairo A. Giraldo, Alvaro A. Cardenas, Nils Ole Tippenhauer, Junia Valente, Mustafa Faisal, Justin Ruths, Richard Candell, and Henrik Sandberg. Limiting the impact of stealthy attacks on industrial control systems. In Proceedings of the 2016 ACM SIGSAC Conference on Computer and Communications Security, CCS '16, p. 1092- 1105, New York, NY, USA, 2016. Association for Computing Machinery.

MR Gauthama Raman, Ahmed Chuadhry Mujeeb, Mathur Aditya. Machine learning for intrusion detection in industrial control systems: challenges and lessons from experimental evaluation. Cybersecurity 2021;4(1):1-12.

Alladi Tejasvi, Chamola Vinay, Zeadally Sherali. Industrial control systems: Cyberattack trends and countermeasures. Comput Commun 2020; 155:1-8.

Cheong Lien Sung Dillon, Gauthama Raman MR, Mathur Aditya P. Design-Knowledge in Learning Plant Dynamics for Detecting Process Anomalies in Water Treatment Plants. Computers & Security 2021;102532, https://www.sciencedirect.com/science/article/pii/S0167404821003564.

Yin Shen, Ding Steven X, Xie Xiaochen, Luo Hao. A review on basic datadriven approaches for industrial process monitoring. IEEE Trans Ind Electron 2014;61(11):6418-28.

Mathur AP, Tippenhauer NO. SWaT: A water treatment testbed for research and training on ICS security. In: International workshop on cyber-physical systems for smart water networks. USA: IEEE; 2016, p. 31-6.

Foreign Communication from a Related Counterpart Application, International Preliminary Report on Patentability dated Aug. 3, 2023, International Application No. PCT/SG2022/050052 filed on Feb. 4, 2022.

Dieter Gollmann. Security for cyber-physical systems. In International doctoral workshop on Mathematical and Engineering Methods in Computer Science, pp. 12-14. Springer, 2012.

\* cited by examiner

| Invariant No. | State Variable | Invariant Description |
|---|---|---|
| INV 1.1 | LIT101 | If LIT101(t) > H, then MV101 = OFF |
| INV 1.2 | | If LIT101(t) < L, then MV101 = ON and P101 = OFF |
| INV 1.3 | | LIT101(t) = LIT101(t-1) + $\eta$(FIT201(t)-FIT101(t)) |
| INV 1.4 | | LL < LIT101 < HH |
| INV 1.5 | | If LIT101 increases, then MV101 = ON |
| INV 1.6 | | If LIT101 decreases, then MV101 = OFF and P101 = ON |
| INV 2 | FIT101 | FIT101(t) = FIT101(t-1) + $\gamma$MV101(t) |
| INV 3 | FIT201 | FIT201(t) = FIT201(t-1) + $\gamma$P101(t) |
| INV 4 | MV101 | If MV101(t) = OFF, then FIT101 = 0 |
| INV 5 | P101 | If P101(t) = OFF, then FIT201 = 0 |

$\eta$ and $\gamma$ are constants of unit conversion

Figure 5

| No. | Independent State Variable | Dependent State Variable | Sample Rule |
|---|---|---|---|
| 1 | FIT101 | | If MV101 is OPEN, then after 5 seconds, FIT101 should be > 0.81 m³/h |
| 2 | | MV101 | If MV101 is CLOSED, then after 7 seconds, FIT101 should be < 3.5 m³/h |
| 3 | LIT101 | | If MV101 is OPEN, then LIT101 should be < (H+50) mm |
| 4 | | | If MV101 is CLOSED, then LIT101 should be > (L-20) mm |
| 5 | | P101 or P102 | If P101 or P102 is ON, then LIT101 should not be < (L-10) mm |
| 6 | FIT101 | | If P101 or P102 is ON, then after 10 seconds, FIT201 should be > 0.5 m³/h |

Figure 7

| No. | Attack Scenario | Attack Intention |
|---|---|---|
| 1 | 1 | Open MV101 |
| 2 | 2 | Turn on P102 |
| 3 | 3 | Increase LIT101 by 1 mm/s |
| 4 | 6 | Set value of AIT202 to 6 |
| 5 | 7 | Increase water level in tank T101 to above H |
| 6 | 8 | Set value of DPIT to >40 kPa |
| 7 | 10 | Set value of FIT401 to < 0.7 m³/h |
| 8 | 11 | Set value of FIT401 to 0 |
| 9 | 16 | Decrease water level in tank T401 by 1 mm/s |
| 10 | 17 | Do not let MV303 open |
| 11 | 21 | Keep MV101 open continuously and set value of LIT101 to 700 mm |
| 12 | 22 | Stop UV401, set value of AIT502 to 150, and force P501 to remain on |
| 13 | 23 | Set value of DPIT301 to >0.4 bar, keep MV302 open, and keep P602 closed |
| 14 | 24 | Turn off P203 and P205 |
| 15 | 25 | Set value of LIT401 to 1000 mm and keep P402 on |
| 16 | 26 | Keep P101 on continuously and set value of LIT301 to 801 mm |
| 17 | 27 | Keep P302 on continuously and set value of LIT401 to 600mm until time 1:26:01 |
| 18 | 30 | Keep P101 on continuously, keep MV101 open continuously, and set value of LIT101 to 700 mm |
| | | P102 started itself because LIT301 level became low |
| 19 | 31 | Set LIT401 to < L |
| 20 | 32 | Set LIT301 to > HH |
| 21 | 33 | Set LIT101 to > H |
| 22 | 34 | Turn P101 off |
| 23 | 35 | Turn P101 off and keep P102 off |
| 24 | 36 | Set LIT101 to < LL |
| 25 | 40 | Set value of FIT401 to 0 |
| 26 | 41 | Decrease LIT301 by 0.5 mm/s |

Figure 8A

| No. | Attack Scenario | Attack Mode | Attack Target State Variable | Attack Intention |
|---|---|---|---|---|
| 1 | A1.1* | NA | LIT101 | Read the value of LIT101 |
| 2 | A1.2* | Gradual-bias | | Continuous attack on LIT101 |
| 3 | A2* | Constant | | Access SCADA through Remote Desktop Protocol (RDP) to change the H value of LIT101 |
| 4 | A3.1* | Fixed-bias | DPIT301 | Spoofing DPIT301 |
| 5 | A3.2* | Constant | | |
| 6 | A4* | Constant | FIT401 | Set FIT401 to a constant to affect UV process |
| 7 | A5** | NA | MV101 and FIT101 | Attack MV101 and FIT101 to flood T101 with more water |
| 8 | A6.1* | NA | P101 | Log into SCADA to change P101 state |
| 9 | A6.2* | Chatter | | Launch chatter attack on P101 for 5 seconds |
| 10 | A7* | Constant | LIT401 | Set LIT401 to a constant 725 mm |
| 11 | A8* | NA | P602 | Turn on P602 to refill the backwash tank T602 |
| 12 | A9* | | MV303 | Open MV303 to water during filtration process |
| 13 | A10* | Constant | LIT401 | Set LIT401 to H to turn off P301 |

*: Single-point attack; **: Multi-point attack

Figure 8B

| No. | Attack Scenario | Attack Detection Rate | | | | | | |
|---|---|---|---|---|---|---|---|---|
| | | DNN | SVM | 1D-CNN records | 1D-CNN attacks | TABOR | LAD-ADS | Anomaly Detection System 300 (AICrit) |
| 1 | 1 | 0 | 0 | 0.99 | 1 | 0.04 | 0.98 | 0.99 |
| 2 | 2 | 0 | 0 | 1 | 1 | 0.93 | 0.792 | 1 |
| 3 | 3 | 0 | 0 | 0.22 | 0.9 | 0 | 0.68 | 0.37* |
| 4 | 6 | 0.71 | 0.72 | 0.9 | 1 | 0.99 | 0.005 | 0.001 |
| 5 | 7 | 0 | 0.88 | 1 | 1 | 0 | 0.05 | 0.99 |
| 6 | 8 | 0.92 | 0.91 | 1 | 1 | 0.61 | 0.98 | 0.98 |
| 7 | 10 | 1 | 0.43 | 1 | 1 | 0.99 | 0.8 | 0.75 |
| 8 | 11 | 0.97 | 1 | 1 | 1 | 0.99 | 0.98 | 0.93 |
| 9 | 16 | 0 | 0 | 0.23 | 1 | 0 | 0.55 | 0.22* |
| 10 | 17 | 0 | 0 | 0.63 | 1 | 0.59 | 0.2 | 0.71 |
| 11 | 21 | 0 | 0.01 | 0.9 | 1 | 0.08 | 0.97 | 0.98 |
| 12 | 22 | 0.99 | 1 | 1 | 1 | 0.99 | 0.98 | 0.98 |
| 13 | 23 | 0.86 | 0.87 | 1 | 1 | 0 | 0.94 | 0.96 |
| 14 | 24 | 0 | 0 | 0.169 | 1 | 0 | 0.01 | 0 |
| 15 | 25 | 0 | 0.01 | 0.019 | 0.2 | 0 | 0.97 | 0.98 |
| 16 | 26 | 0 | 0 | 1 | 1 | 0.99 | 0.79 | 0.86 |
| 17 | 27 | 0 | 0 | 0.06 | 1 | 0.19 | 0.46 | 0.87 |
| 18 | 30 | 0 | 0 | 1 | 1 | 0.99 | 0.94 | 0.98 |
| 19 | 31 | 0 | 0 | 0.303 | 0.2 | 0 | 0.86 | 0.93 |
| 20 | 32 | 0 | 0.9 | 0.93 | 1 | 0 | 0.93 | 0.98 |
| 21 | 33 | 0 | 0 | 0.88 | 1 | 0.89 | 0.84 | 0.92 |
| 22 | 34 | 0 | 0 | 0.6 | 1 | 0.99 | 0 | 0 |
| 23 | 35 | 0 | 0 | 0 | 0 | 0.25 | 0.36 | 0.3 |
| 24 | 36 | 0 | 0.11 | 0.87 | 1 | 0.88 | 0.87 | 0.83 |
| 25 | 40 | 0.99 | 0.92 | 1 | 1 | 0.99 | 0.86 | 0.9 |
| 26 | 41 | 0 | 0.35 | 0.638 | 1 | 0 | 0.845 | 0.87 |
| *Detected after the attack was removed. | | | | | | | | |

Figure 9A

| No. | Anomaly Detectors | False Positive Rate (%) | |
|---|---|---|---|
| | | Automated Mode | Manual Mode |
| 1 | MLP | 0 | 0.87 |
| 2 | DAD | 0 | 0 |
| 3 | Anomaly Detection System 300 (AiCrit) | 0 | 0 |

Figure 9B

| Attack Scenario | Detection Time (seconds) | | |
|---|---|---|---|
| | MLP | DAD | Anomaly Detection System 300 (AiCrit) |
| A1.2 | 18 | 10 | 16 |
| A2 | 5 | 2 | 2 |
| A3.1 | Not detected | | 3 |
| A3.2 | | | 4 |
| A4 | | | 19 |
| A5 | 24 | Not detected | 32 |
| A6.2 | Not detected | | 23 |
| A7 | 15 | | 10 |
| A8 | Not detected | | 19 |
| A9 | | 2 | 3 |
| A10 | 9 | 2 | 5 |

Figure 9E

| No. | Attack Scenario | Attack Target State Variable | Attack Launch Time | Attack Detection Time | Detection Time (seconds) | Tag Raised Alert |
|---|---|---|---|---|---|---|
| 1 | A1.1 | LIT101 | 10:34:05 | - | - | - |
| 2 | A1.2 | | 10:55:28 | 10:56:44 | 16 | $LIT101_R$, |
| 3 | A2 | | 11:02:36 | 11:02:38 | 2 | $LIT101_A$ |
| 4 | A3.1 | DPIT301 | 11:18:22 | 11:18:25 | 3 | $MV301_R$, $MV303_R$ |
| 5 | A3.2 | | 11:18:19 | 11:18:23 | 4 | $MV303_R$ |
| 6 | A4 | FIT401 | 11:24:17 | 11:24:35 | 19 | $P401_R$ |
| 7 | A5 | MV101, FIT101 | 11:31:26 | 11:31:58 | 32 | $MV101_R$ |
| 8 | A6.1 | P101 | 11:35:07 | - | - | - |
| 9 | A6.2 | | 11:35:07 | 11:35:30 | 23 | $P101_R$ |
| 10 | A7 | LIT401 | 11:39:40 | 11:39:50 | 10 | $MV302_R$, $LIT401_A$ |
| 11 | A8 | P602 | 12:18:20 | 12:18:39 | 19 | $P602_R$ |
| 12 | A9 | MV303 | 12:25:20 | 12:25:23 | 3 | $MV303_R$ |
| 13 | A10 | LIT401 | 12:39:21 | 12:39:26 | 5 | $LIT401_R$, $LIT401_A$ |
| *Subscript A means alert was raised by the first behavioural models 330; Subscript R means alert was raised by the second behavioural models 340* | | | | | | |

Figure 9D

ANOMALY DETECTION SYSTEM AND METHOD USING INVARIANTS FOR AN INDUSTRIAL CONTROL SYSTEM

CROSS-REFERENCE TO RELATED APPLICATIONS

The present application is a filing under 35 U.S.C. 371 as the National Stage of International Application No. PCT/SG2022/050052, filed Feb. 4, 2022, entitled "ANOMALY DETECTION SYSTEM AND METHOD FOR AN INDUSTRIAL CONTROL SYSTEM," which claims priority to Singapore Application No. SG 10202101249T filed with the Intellectual Property Office of Singapore on Feb. 5, 2021, both of which are incorporated herein by reference in their entirety for all purposes.

CROSS REFERENCE TO RELATED APPLICATION(S)

The present disclosure claims the benefit of Singapore Patent Application No. 10202101249T filed on 5 Feb. 2021, which is incorporated in its entirety by reference herein.

TECHNICAL FIELD

The present disclosure generally relates to an anomaly detection system and method for an industrial control system. More particularly, the present disclosure describes various embodiments of a system and method for detecting anomalies in the industrial control system, such as those due to cyberattacks on the industrial control system.

BACKGROUND

Modern Industrial Control Systems (ICS) play a vital role in controlling and automating industrial processes in critical public infrastructure, such as water treatment and distribution plants, oil/natural gas plants, power generation plants, and power distribution grids. An ICS typically has three major components—computing systems such as programmable logic controllers (PLCs), communication infrastructure, and physical devices such as sensors and actuators. The communication infrastructure connects the computing systems with the physical devices to perform their functions. A physical process controlled by an ICS, such as water treatment process, evolves over time in accordance with the design of the control algorithms in the PLCs. Cooperating with the sensors and actuators, the PLCs monitor the current system state of the ICS and control the overall system behaviour of the ICS. A combination of PLCs, sensors, and actuators constitutes a distributed control system that operates in real-time, often without interruption and with minimal human involvement. Usually, all components of the ICS are deployed within an air gap, i.e., using an isolated communication network. More recently, advancement in information technology (IT) has led to the growing openness of ICS towards the corporate network for economic and operational gains.

ICS in public infrastructure have become a target of cyberattacks. The connectivity of ICS to the public network increases the chances of the ICS being subjected to a variety of cyberattacks. Cyberattacks on the ICS can be defined as intentional actions aimed at causing undesired effects in the physical world. The primary intention of these targeted cyberattacks is to disrupt or change the underlying physical process to a state which does not conform to its design specifications. For example, cyberattacks typically target, directly or indirectly, the physical devices of the ICS by manipulating the sensor measurements and control signals to the actuators, thereby causing abnormal changes in the system state and physical process. Such abnormal changes in the system state and physical process are referred to as anomalies. To mitigate undesirable consequences in the ICS operation and to maintain ICS safety, such anomalies should be detected and responded to quickly, allowing the cause of the anomalies to be eliminated before damage to the ICS occurs.

In a real-time cyberattack, an attacker can make use of several strategies to prevent the early detection by the existing defense mechanisms to achieve their malicious intention. Such sophisticated cyberattacks on the ICS can evade existing defense mechanisms of the ICS and cause catastrophic damages or failures with significant impact to the components of the ICS or even lead to service disruption. Timely detection of such sophisticated cyberattacks and anomalies in the ICS is hence important to protect the ICS.

Many existing cyberattack detection solutions for ICS are extensions of the traditional network-centric or IT-centric defense system or infrastructure such as Intrusion Detection Systems (IDS), access control systems, encryption protocols, and firewalls to prevent intrusions into the ICS. Such solutions are designed for preventing unauthorized access into the ICS, but are inadequate for defending the ICS from cyberattacks and protecting critical infrastructure against malicious intruders, especially against insiders.

Some ICS employ anomaly detectors that work in real-time together with the operation of the ICS. There are two types of such anomaly detectors, namely design-centric and data-centric. Design-centric anomaly detectors are based on the design knowledge of the ICS. The design knowledge may include the ICS architecture specifications of each component, computing, and communication infrastructure details. Such design knowledge may be available in operator manuals, vendor specifications and other design documents that are useful during ICS maintenance and upgrade. Additionally, such design knowledge can be coded to ensure the normal operation of the ICS in real-time.

One example of a design-centric anomaly detector is the Distributed Attack Detector (DAD), such as described in U.S. Pat. No. 10,911,482. The DAD is built for the SWaT (Secure Water Treatment) testbed plant at the Singapore University of Technology and Design (SUTD). The DAD is generated from plant design based on fundamental laws of physics and chemistry, and manually extracts deterministic rules from the plant design to govern the plant operation. The DAD is able to detect anomalies in real-time when such rules are violated. However, as these rules are manually created, the DAD is only feasible for small plants that contain a few components, such as the SWaT testbed plant. It is not feasible to implement the DAD in large commercial plants, such as city-scale water treatment plants, because of the multitude and variety of heterogeneous components in the plants with complex interrelationships which would be prohibitively complex and time-consuming to model manually.

Existing data-centric anomaly detectors combine machine learning algorithms, such as Long Short-Term Memory (LSTM) Network, Recurrent Neural Network (RNN), and Generative Adversarial Network (GAN), etc. with statistical techniques to detect anomalies. However, these data-centric anomaly detectors are based on temporal dependencies across the plant components which limit their applicability to plant components with continuous state variables, such as sensors monitoring the physical and chemical properties of water. These data-centric anomaly detectors fail to learn the behaviours of the complex heterogeneous components in large plants, resulting in an unacceptable number of false alarms.

Therefore, given the existing vulnerabilities of ICS and threats of cyberattacks to the ICS, and in order to address or alleviate at least one of the aforementioned problems and/or disadvantages, there is a need for an improved anomaly detection system and method for the ICS.

SUMMARY

According to aspects of the present disclosure, there is a system and method for detecting anomalies in an industrial control system. The anomaly detection method comprises: determining state variables of the industrial control system based on a system design of the industrial control system; determining invariants governing the state variables based on the system design; receiving historical measurement data of the state variables of each invariant from the industrial control system; constructing a set of behavioural models for each invariant using a set of machine learning algorithms and the historical measurement data of the respective state variables of the invariant, the behavioural models representing normal behaviour of the respective state variables; predicting measurement data of the state variables of each invariant using the behavioural models and the historical measurement data of the respective state variables; receiving current measurement data of the state variables during operation of the industrial control system; and detecting the anomalies based on deviations between the current measurement data and predicted measurement data of the state variables of each invariant.

A system and method for detecting anomalies in an industrial control system according to the present disclosure are thus disclosed herein. Various features, aspects, and advantages of the present disclosure will become more apparent from the following detailed description of the embodiments of the present disclosure, by way of non-limiting examples only, along with the accompanying drawings.

BRIEF DESCRIPTION OF THE DRAWINGS

FIG. 5 is a table of some invariants and state variables of the water treatment process.

FIG. 7 is a table of some rule models for the water treatment process.

FIGS. 8A and 8B are tables of attack scenarios used to evaluate performance of the anomaly detection system.

FIGS. 9A to 9E are illustrations of evaluation results on the performance of the anomaly detection system.

DETAILED DESCRIPTION

Figure 1:
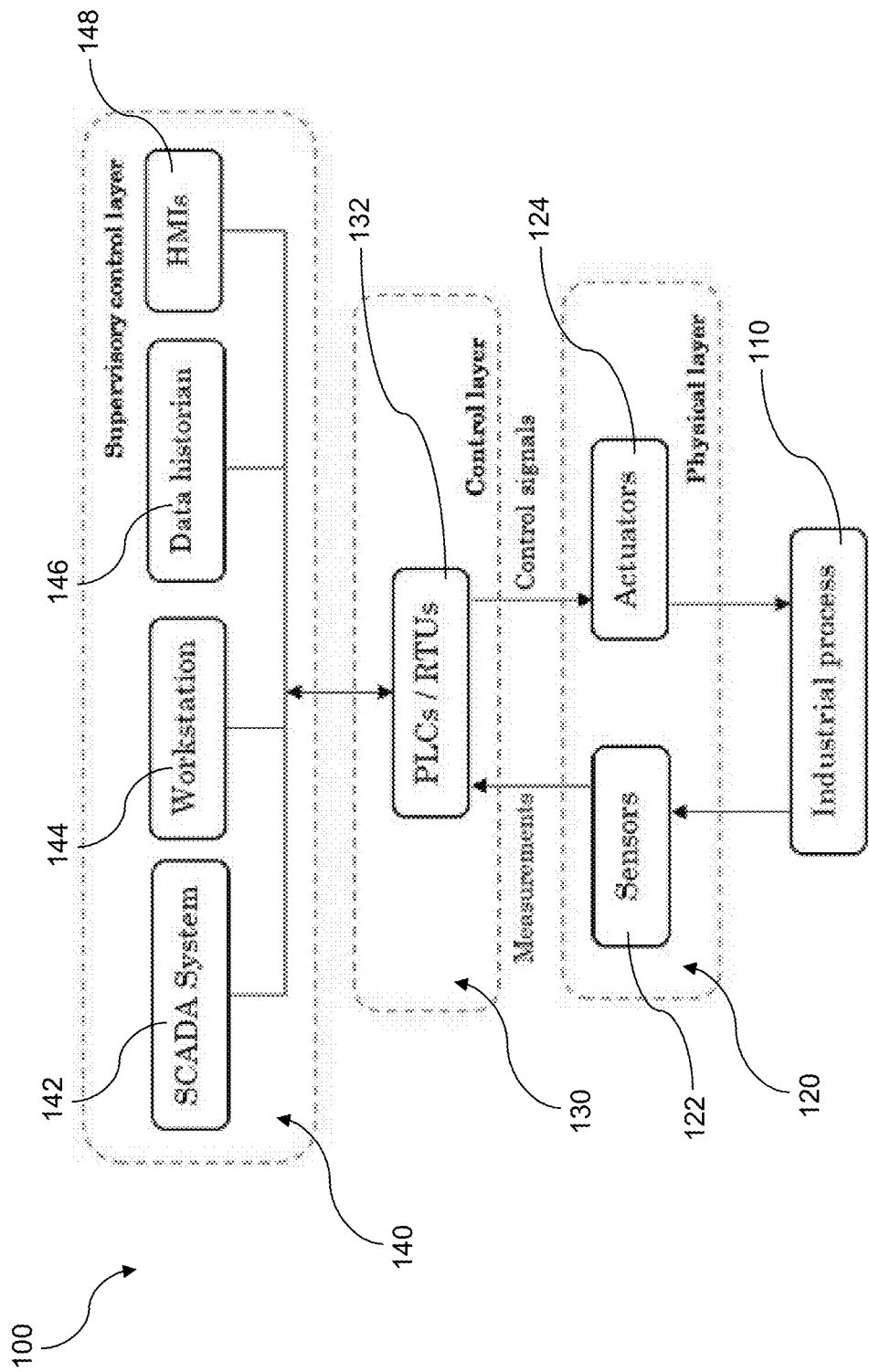
FIG. 1 is a schematic illustration of an industrial control system.

For purposes of brevity and clarity, descriptions of embodiments of the present disclosure are directed to a system and method for detecting anomalies in an industrial control system, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e., a skilled person, that the present disclosure may be practiced without specific details, and/or with multiple details arising from combinations of aspects of particular embodiments. In a number of instances, well-known systems, methods, procedures, and components have not been described in detail so as to not unnecessarily obscure aspects of the embodiments of the present disclosure.

In embodiments of the present disclosure, depiction of a given element or consideration or use of a particular element number in a particular figure or a reference thereto in corresponding descriptive material can encompass the same, an equivalent, or an analogous element or element number identified in another figure or descriptive material associated therewith.

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "a" and "an" are defined as one or more than one. The use of "/" in a figure or associated text is understood to mean "and/or" unless otherwise indicated. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions. The recitation of a particular numerical value or value range herein is understood to include or be a recitation of an approximate numerical value or value range.

Embodiments of the present disclosure describe a system and method for detecting anomalies in an industrial control system (ICS) 100. The general architecture of an ICS 100 is shown in FIG. 1. The ICS 100 is application-specific with a layered architecture that integrates computing and communication components with physical devices to control the underlying industrial or physical process 110. The components of the ICS 100 are distributed across three main layers of the ICS 100, namely the physical layer 120, control layer 130, and supervisory control layer 140.

The physical layer 120 includes physical devices, such as sensors 122 and actuators 124, that measure and control the physical process 110. The physical layer 120 may optionally include remote devices such as input/output (IO) devices. The control layer 130 includes programmable logic controllers (PLCs) and/or remote terminal units (RTUs) (collectively referred to as PLCs 132). It will be appreciated that the PLCs 132 are generally programmable in a variety of suitable programming languages such as ladder logic, structured text, and functional blocks. The supervisory control layer 140 includes a Supervisory Control and Data Acquisition (SCADA) system 142 and workstation 144 for for overall monitoring and control of the physical process 110, data historian 146 for recording inputs to and outputs from the PLCs 132, and Human-Machine Interfaces (HMIs) 148.

The communication infrastructure in the ICS 100 is divided into two levels—Level 0 and Level 1. Level 0 refers to the communication network between the physical layer 120 and control layer 130. Specifically, the Level 0 communication network uses a ring network topology to enable communications among the sensors 122, actuators 124, and PLCs 132. Level 1 refers to the communication network between the control layer 130 and supervisory control layer 140. Specifically, the Level 1 communication network uses a star network topology to enable communications among the PLCs 132, SCADA system 142 and workstation 144, data historian 146, and HMIs 148. Communications in the Level 0 and Level 1 communication networks are carried out through the secure communication channels with appropriate security protocols, as will be readily understood by the skilled person.

The sensors 122 and actuators 124 in the physical layer 120 report and modify the current state of the physical process 110 based on the control signals transmitted and received from the PLCs 132 in the control layer 130. In an example of the ICS 100 being a water treatment plant, the sensors 122 communicate to the PLCs 132 the physical and chemical properties of water, such as water level in a tank, water flow rate, pH value, and the chlorine content. Based on the received data from the sensors 122, the PLCs 132 issue control signals or commands to the actuators 124, such as to open or close a valve, and to run or stop a pump. The sensors 122 and actuators 124 represent state variables of the ICS 100. A state variable measures one state attribute of one component of the ICS 100, such as the water level in a tank. The supervisory control layer 140 enables the operators of the ICS 100 to monitor the physical process 110 and control actions taken by the PLCs 132.

The communications infrastructure of an ICS 100 may be connected to an external communications network, but such connections render the ICS 100 susceptible to cyberattacks. Such cyberattacks may compromise the Level 0 and/or Level 1 communication networks. Each communication link is considered as an attack point in the ICS 100 and once a communication link is compromised, an attacker can, for example, send false sensor data to the PLCs 132 or bypass the PLCs 132 and directly control the actuators 124. Examples of the ICS 100 and attack scenarios are described below.

Figure 2A:
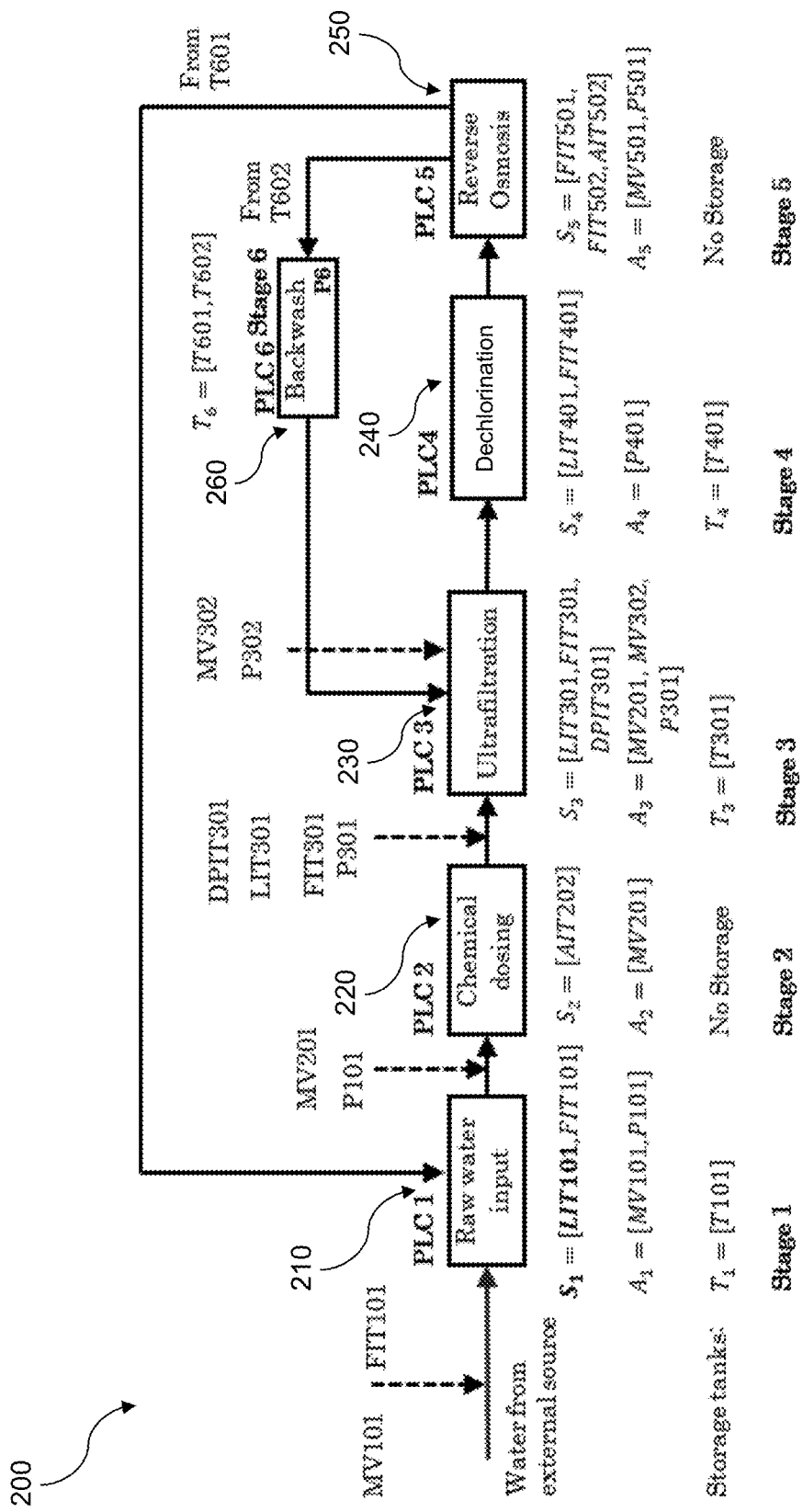
FIGS. 2A and 2B are schematic illustrations of a water treatment process.

An exemplary ICS 100 is a water treatment plant to perform a water treatment process. One example of a water treatment plant is the SWaT testbed plant at SUTD for performing the water treatment process 200, as shown in FIG. 2A. The SWaT testbed plant is a fully operational and scaled down water treatment plant that produces 5 gallons of filtered water per minute. Its architecture replicates that of large modern water treatment plants found in cities.

As shown in FIG. 2A, the water treatment process 200 can be divided into 6 process stages—Stage 1 (Raw Water Input 210), Stage 2 (Chemical Dosing 220), Stage 3 (Ultrafiltration 230), Stage 4 (Dechlorination 240), Stage 5 (Reverse Osmosis 250), and Stage 6 (Backwash 260). Each of the 6 process stages is equipped with a set of sensors 122 and a set of actuators 124 that are controlled by a PLC 132. The sensors 122 include water level sensors (labelled "LIT"), chemical property sensors (labelled "AIT"), flow rate indicators or flow sensors (labelled "FIT"), and differential pressure indicators (labelled "DPIT"). The actuators 124 include motorized valves (labelled "MV") and pumps (labelled "P"). The PLCs 132 across the 6 process stages are communicative with each other to share information about the state information of their corresponding sensors 122 and actuators 124 for executing the water treatment process 200 in coordination.

Stage 1 controls the inflow of raw water to be treated by opening or closing a motorized valve MV101 that connects an external water source to the inlet of a raw water tank T101. Water from the tank T101 is pumped via a chemical dosing station in Stage 2 to an ultrafiltration (UF) unit in Stage 3 for the removal of solid materials in the water. In Stage 3, using an UF feed pump, the filtered water is transferred to a tank T401 in Stage 4 to remove excess chlorine, which is used to disinfect the water. In Stage 4, the dechlorination unit, such as an ultraviolet (UV) unit, treats the water through an UV chlorination process to remove the excess chlorine from the water. The dechlorinated water is then transferred to the reverse osmosis (RO) filtration unit in Stage 5 for a two-stage RO process to remove inorganic impurities in the water. In Stage 5, the dechlorinated water is passed through the two-stage RO unit and the filtered water is then stored in tanks T601 and T602 in Stage 6. The water in the tank T602 is utilized for cleaning the filter membranes in the UF unit in Stage 3 through a backwash process in Stage 6. The water in the tank T601 is recycled to the tank T101 in Stage 1.

The communication infrastructure of the SWaT plant is not connected to any other external network. However, there is a wireless network through which the sensors 122, actuators 124, and PLCs 132, and other devices communicate with each other. An attacker, such as of the insider type, can exploit vulnerabilities in the network protocols or PLC firmware to compromise the communication links, such as between the PLC 132 and sensors 122, PLC 132 and actuators 124, and PLC 132 and SCADA system 142. Through the compromised communication links, the attacker can inject false information or spoof the values of measurement data transferred from one or more sensors 122 to one or more PLCs 132 to alter the process flow of the water treatment process 200 and/or to damage the physical devices.

Figure 2B:
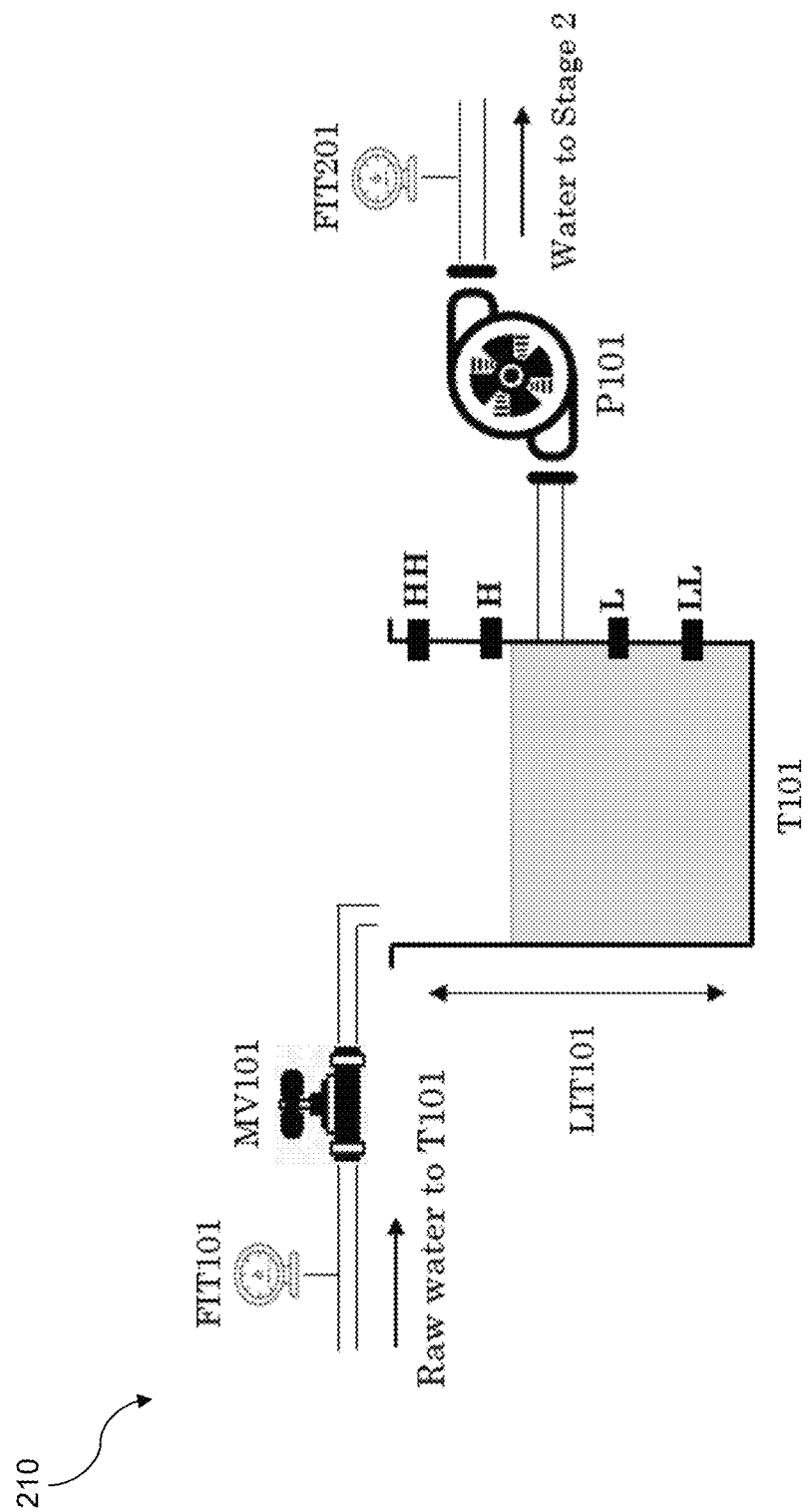

An exemplary simple attack scenario on the SWaT plant to disrupt the water treatment process 200 is described as follows. The specific process stage or operation in Stage 1 (Raw Water Input 210) is shown in FIG. 2B. Stage 1 has a set of physical devices including the corresponding sensors 122, actuators 124, and PLCs 132 that define a set of state variables n, as shown in Equation 1. $n_1$, $n_2$, and $n_3$ are continuous state variables, and $n_4$ and $n_5$ are discrete state variables. The state space of each component in n, i.e. $n_1$ to $n_5$, can be expressed as $V_1$ to $V_5$, respectively, as shown in Equations 2 to 6.

$$n=\{n_1:LIT101, n_2:FIT101, n_3:FIT201, n_4:P101, n_5: MV101\} \quad \text{Equation 1}$$

$$V_1 = \{x_1 \in \mathbb{R}\} \quad \text{Equation 2}$$

$$V_2 = \{x_2 \in \mathbb{R}\} \quad \text{Equation 3}$$

$$V_3 = \{x_3 \in \mathbb{R}\} \quad \text{Equation 4}$$

$$V_4 = \{ON, OFF\} \quad \text{Equation 5}$$

$$V_5 = \{OPEN, CLOSED\} \quad \text{Equation 6}$$

The motorized valve MV101 controls the flow of water to the raw water tank T101. The rate of inflow is measured the at flow sensor FIT101 and the water level in the tank T101 is measured by the level sensor LIT101. The pump P101 pumps water from the tank T101 to the next stage (Stage 2 or Chemical Dosing 220). The overall operation of Stage 1 is monitored and controlled by PLC1. The tank T101 is labelled with four markers, namely LL, L, H, and HH, as shown in FIG. 2B. Each marker represents a particular value of the water level in the tank T101 and is used by the PLC1 to control the state of the motorized valve MV101 and pump P101. During normal plant operation, the motorized valve is MV101 is closed when the water level is above H, and MV101 is open when the water level falls below L. The pump P101 is switched on when the water level is above L to transfer water to Stage 2, and P101 is switched off when the water level is below L.

Figure 3:
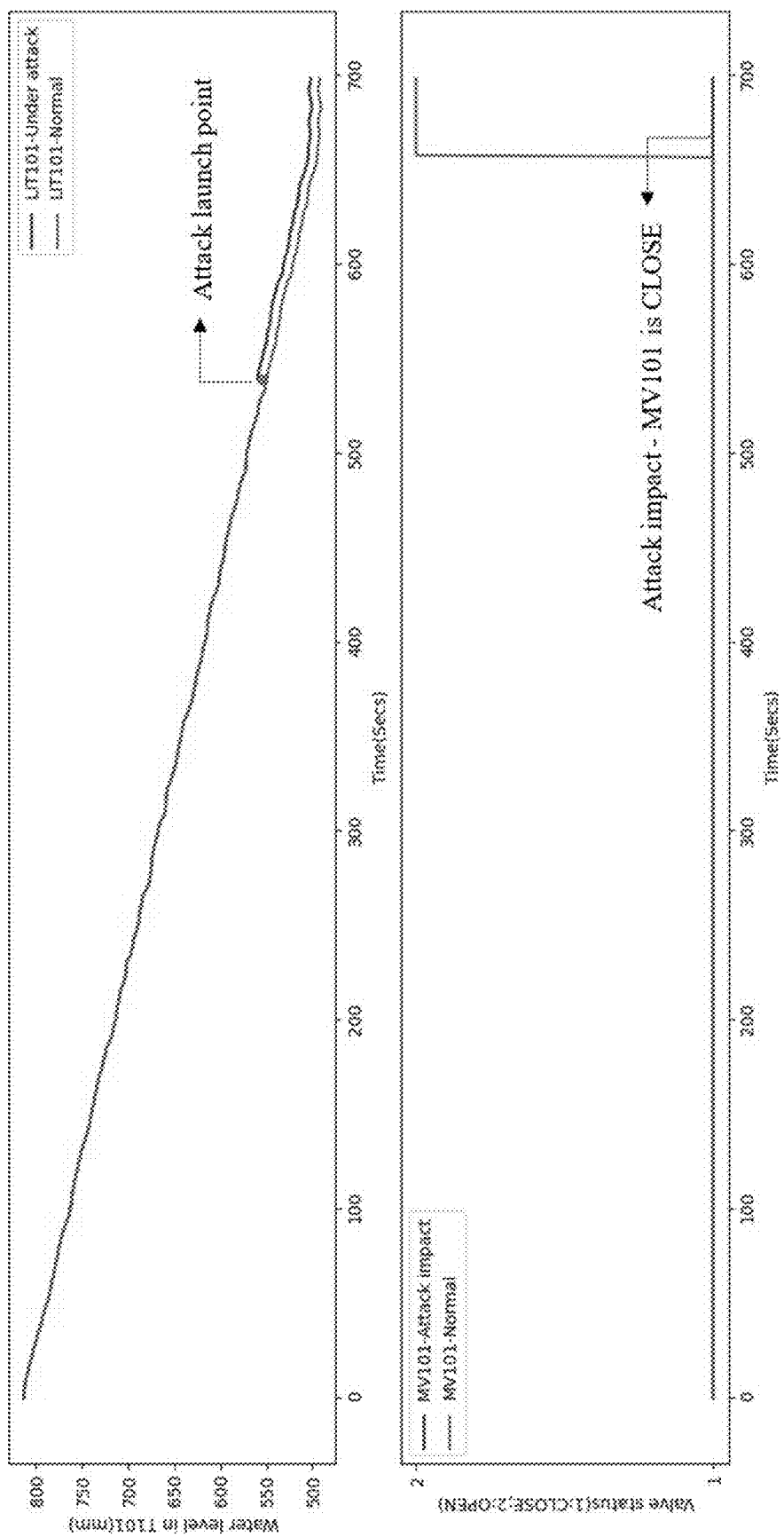
FIG. 3 is an illustration of an attack scenario on a plant performing the water treatment process.

If an attacker wants to underflow the tank T101, MV101 should be kept closed even though water level in T101 is below L. In this attack scenario as shown in FIG. 3, the attack is launched against the level sensor LIT101 in the state where LIT101 is at 550 mm and MV101 is closed. During normal operation, the water level measurement from LIT101 falls gradually as water is pumped out by P101 from T101 to Stage 2. MV101 remains closed until LIT101 reaches L which is 500 mm. Due to the attack against LIT101 at the 550 mm level, whenever the measurement from LIT101 falls below 550 mm, it is increased by 10 mm and the manipulated value is reported to PLC1. Thus, when the actual water level reaches L (500 mm), the manipulated value of 510 mm is sent to PLC1. In response, PLC1 does not send the control signal to open MV101. The water in T101 is continuously pumped out to Stage 2 and over time, T101 will not have enough water for the subsequent stages, thereby affecting the entire water treatment process 200. This simplified attack scenario illustrates how an attacker can potentially affect the SWaT plant and cause anomalies in the water treatment process 200 through cyberattacks by spoofing the measurement data of the sensors 122.

Figure 4A:
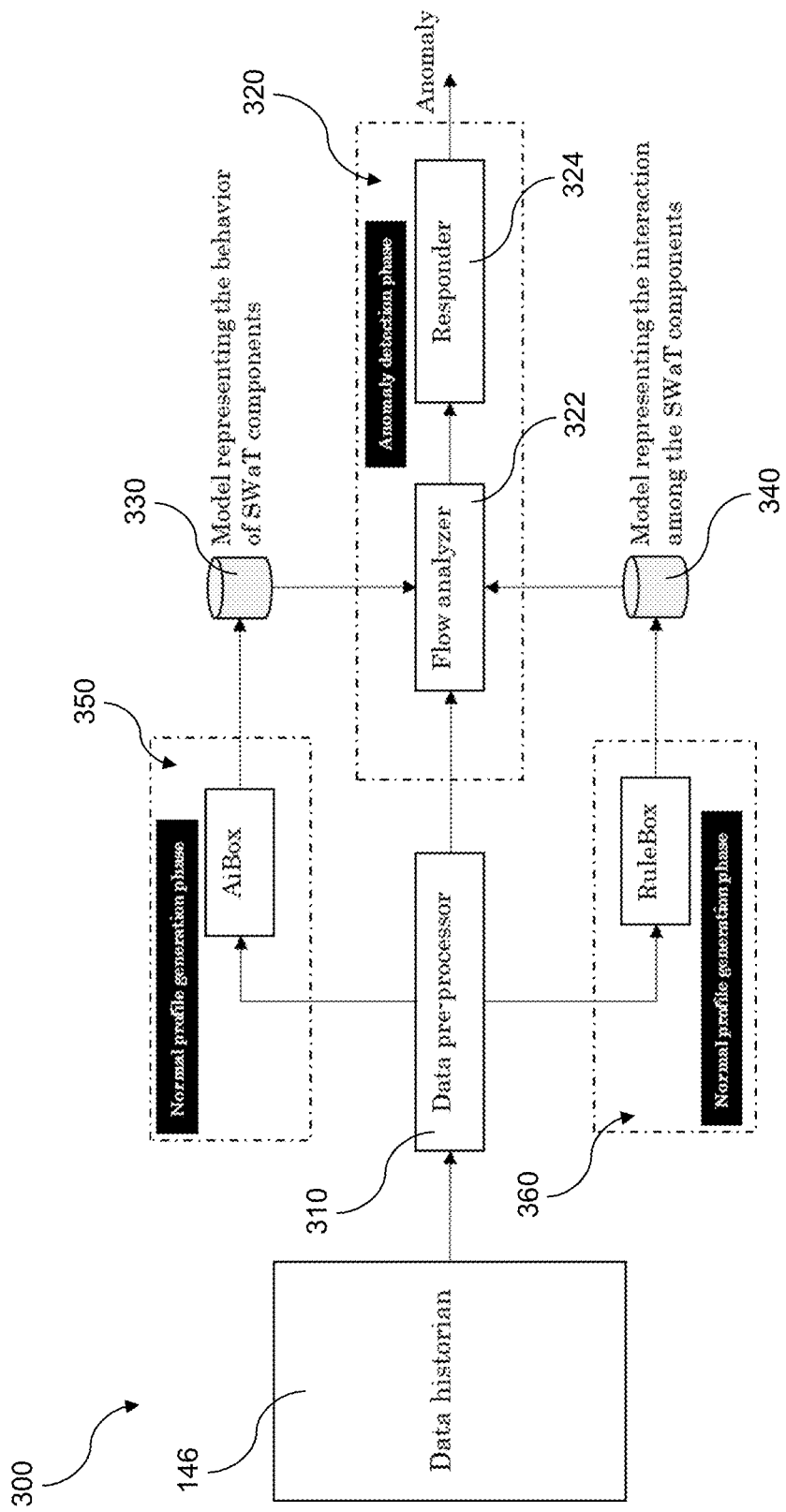
FIGS. 4A and 4B are schematic illustrations of an anomaly detection system according to embodiments of the present disclosure.
Figure 4B:
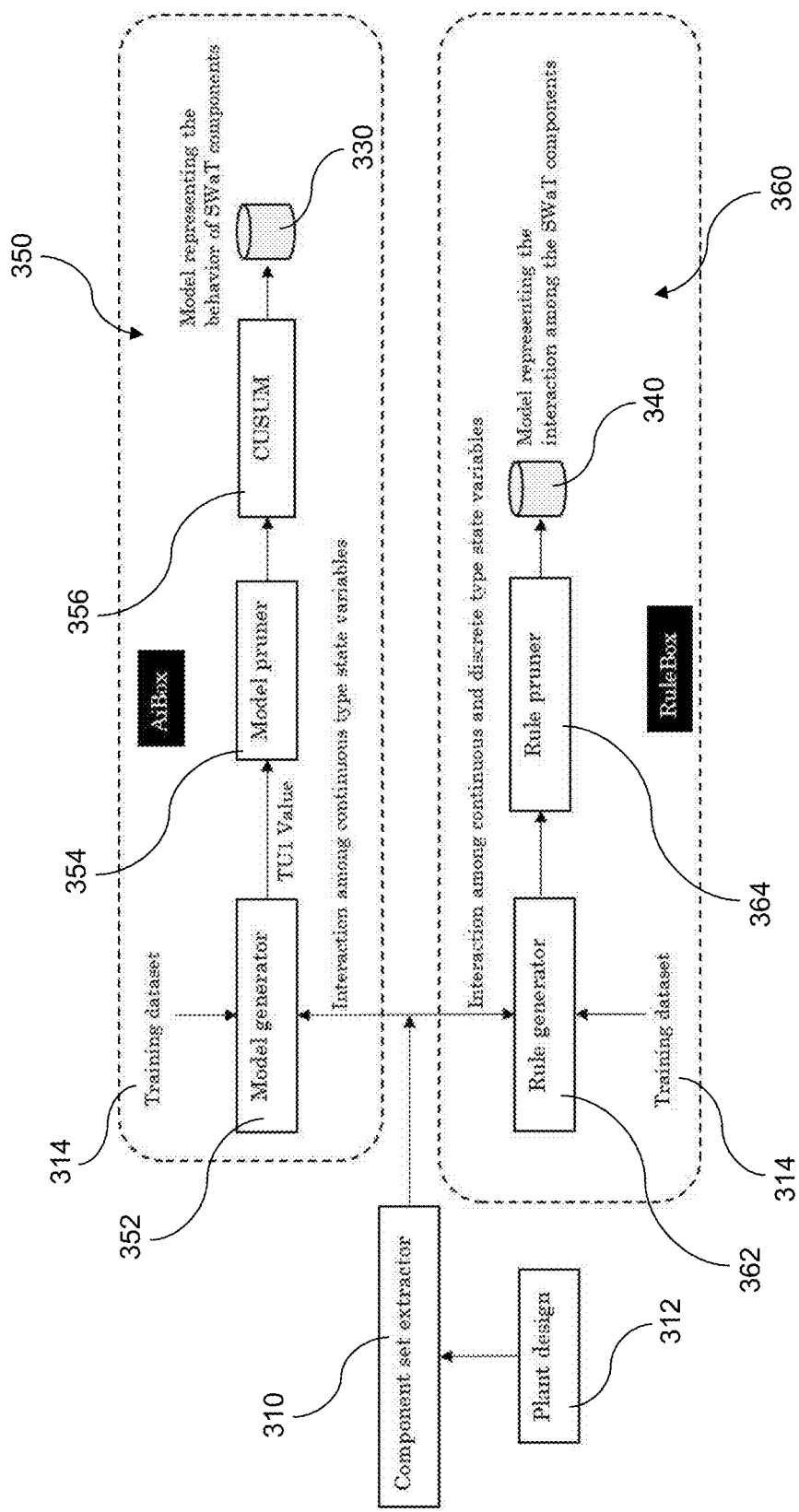

In representative or exemplary embodiments of the present disclosure with reference to FIGS. 4A and 4B, there is an anomaly detection system 300 and computer-implemented or computerized anomaly detection method for detecting anomalies in an ICS 100. The system 300 may be referred to as "AICrit". The method can be performed on a computer system having one or more processors and various steps of the computerized method are performed in response to non-transitory instructions operative or executed by the processors. The non-transitory instructions are stored on a memory of the computer system and may be referred to as computer-readable storage media and/or non-transitory computer-readable media. Non-transitory computer-readable media include all computer-readable media, with the sole exception being a transitory propagating signal per se.

The anomaly detection system 300 is installed as part of the supervisory control layer 140 of the ICS 100 and is communicative with the data historian 146 for ensuring that the physical process 110 is under control and runs normally.

The system 300 ensures the control behaviour integrity of the ICS 100 during operation through the interaction among its physical components including the sensors 122 and actuators 124. The system 300 relies on measurement data obtained from the data historian 146 for the anomaly detection process and does not require architectural changes or modifications in the control code of the PLCs 132. In many embodiments, the ICS 100 is a large commercial water treatment plant which is built and operated based on the standard design principles and guidelines of the United States National Institute of Standards and Technology (NIST).

Following the above example of the SWaT plant, the ICS 100 can be mathematically modelled as a multivariate and distributed system with n components, where the state of each component at time t is represented by the state variable $x_i(t)$, $1 \leq i \leq n$. The n-dimensional state vector that denotes the state of the ICS 100 can be expressed as X(t) as shown in Equations 7 and 8.

$$X(t) = [x_1(t), x_2(t), \ldots, x_i(t), \ldots, x_n(t), i=1,2,\ldots,n] \quad \text{Equation 7}$$

$$X(t) = X_c(t) \cup X_d(t) \quad \text{Equation 8}$$

Given that the ICS 100 has continuous and discrete state variables, X(t) can be expressed as Equation 8, where $X_c(t)$ and $X_d(t)$ denote, respectively, the observable state of the continuous and discrete state variables. For example, the state space of a motorized valve (e.g. MV101) is discrete whereas that of the flow rate of water (e.g. FIT101) is continuous. The anomaly detection system 300 is designed based on this mathematical model of the ICS 100 and the spatiotemporal dependencies among the state variables. More specifically, the system 300 includes a set of behavioural models that can represent the behaviour of the state variables including the physical interactions among them, as described further below.

As shown in FIGS. 4A and 4B, the system 300 includes a data pre-processor module 310 for determining the state variables of the ICS 100 based on a system design 312 of the ICS 100, and for determining invariants governing the state variables based on the system design 312. The system design 312 may include a piping and instrumentation diagram (P&ID) of the ICS 100. The invariants are designed based on the relationships among the physical and/or chemical properties of the underlying physical process 110 operative in the ICS 100. An invariant defines a condition that must hold in a given state of the ICS 100. This condition describes the expected behaviour of the state variables of the invariant under normal operation of the ICS 100. An anomaly in the physical process 110 can be detected based on deviation from the invariant or expected behaviour of the corresponding state variables.

An exemplary set of invariants and corresponding state variables of Stage 1 of the water treatment process 200 operative in the SWaT plant is shown in FIG. 5. These invariants describe and model the expected or normal behaviour of the respective state variables, and they can be categorized into two types. The first type of invariants captures the behaviour of only continuous state variables, particularly the functional relationship or dependency across them, such as INV 1.1, INV 1.2, INV 1.4, and INV 1.5. The second type of invariants captures the behaviour of both continuous and discrete state variables, particularly the functional relationship or dependency across them, such as INV 1.3.

Further, the data pre-processor module 310 is configured for receiving historical measurement data of the state variables of each invariant from the ICS 100. As shown in FIG. 4A, the data pre-processor module 310 is communicative with the data historian 146 for receiving the historical measurement data of the continuous and discrete state variables. Additionally, the data pre-processor module 310 is configured for receiving current measurement data of the state variables during operation of the ICS 100, wherein the current measurement data can be used to detect the anomalies. The communication link between the data historian 146 and data pre-processor module 310 is one-way such that the data pre-processor module 310 can only receive measurement data from the data historian 146 but cannot return or alter any data in the data historian 146.

The data pre-processor module 310 may receive the measurement data at predefined intervals, such as once every second. The data pre-processor module 310 may convert the measurement data into a compatible computer-readable format, such as numeric format. For example, the state variables of the actuators 124 may be converted to "1" for "CLOSED" or "OFF", and "2" for "OPEN" or "ON". Further, there is a transient state that occurs for a short duration, such as a few seconds, when an actuator 124 changes state, such as opening a motorized valve that is initially closed. This transient state may also be represented as "1".

The system 300 further includes a set of machine modelling modules for constructing a set of behavioural models for each invariant, the behavioural models representing normal behaviour of the respective state variables of the invariant. More specifically, the machine modelling modules are configured to construct the behavioural models for each invariant using a set of machine learning algorithms and the historical measurement data of the respective state variables of the invariant. The machine modelling modules utilize the historical measurement data corresponding to normal operation of the ICS 100 to learn its process dynamics and control strategies.

Figure 6:
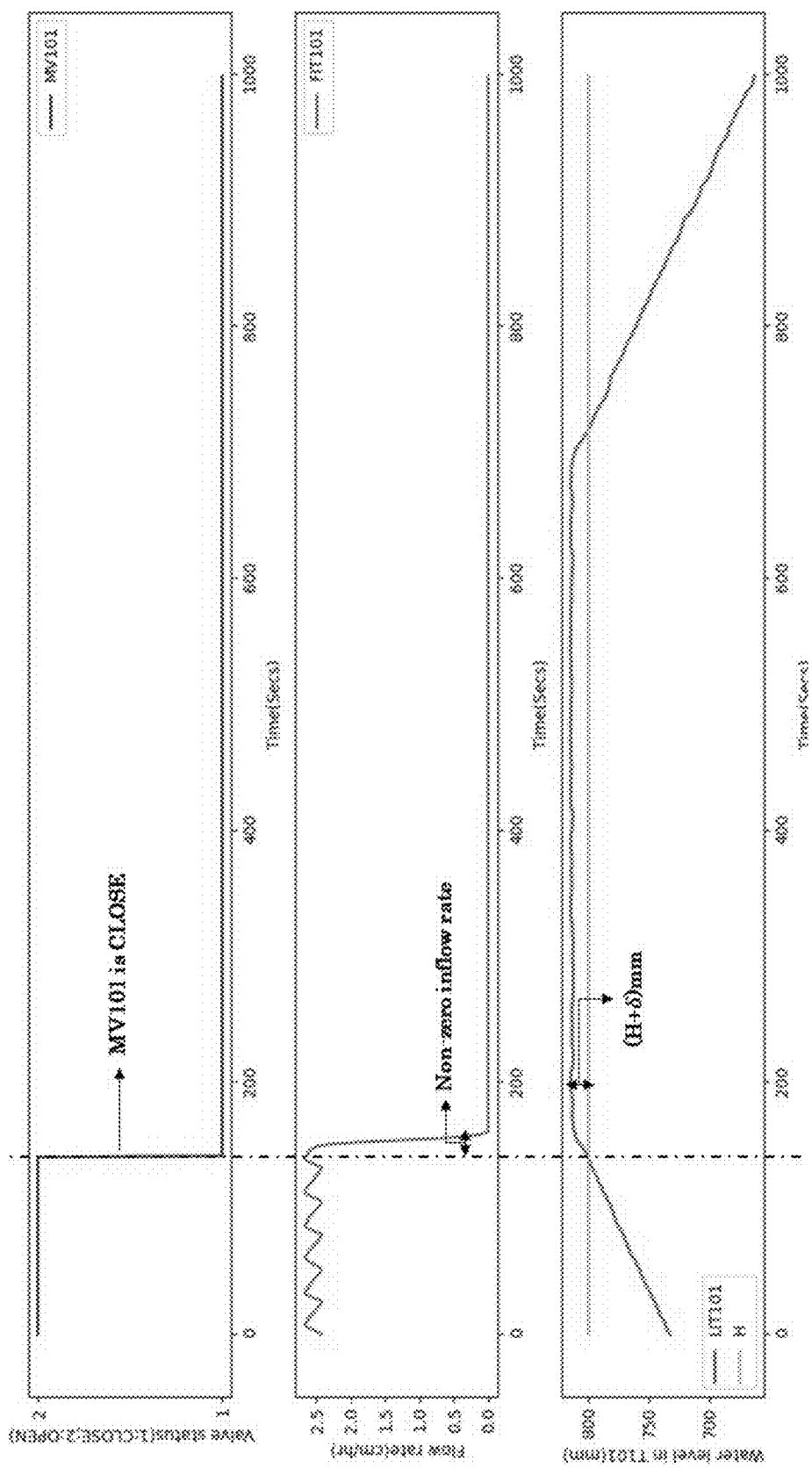
FIG. 6 is an illustration of a transient state of a component of the water treatment process.

Additionally, machine learning algorithms are utilized together with design knowledge from the invariants for effective modelling of the system behaviour of the ICS 100. As mentioned above, there are transient states when actuators 124 change states. For example, the opening and closing of the motorized value MV101 is not immediate. When PLC1 sends the control signal to close MV101, the inflow rate measured by FIT101 will not be instantly zero. FIG. 6 illustrates the impact of the transient state of MV101 in Stage 1. When MV101 in receives the control signal to close, there is some non-zero inflow rate for a few seconds, causing the measurement data from LIT101 to increase by a small value δ from H. Such transient states have an impact on the water treatment process 200, such as time delay in the water flow to reach zero and the increase or decrease in the water level of tanks from their level markers. Such operational discrepancies caused by the transient states can be learned and modelled in the behavioural models using the data-centric machine learning algorithms together with the design-centric invariants. This improves accuracy of the behavioural models for more precise anomaly detections and minimizing false positives.

The system 300 further includes an anomaly detection module 320 that runs concurrently with the ICS 100 for continuously monitoring the physical process 110 to effectively detect anomalies. The anomaly detection module 320 includes a data analyzer module 322 that receives the current measurement data of the state variables from the data pre-processor module 310 for detecting the anomalies. The anomaly detection module 320 operates over the spatiotemporal dependencies among the state variables and hence the data pre-processor module 310 ensures that correct and valid measurement data is sent to the data analyzer module 322. In case of any delay, glitches, or noise in the measurement data, the data pre-processor module 310 may be configured to neglect the affected set of measurement data and sends the previous unaffected set to the data analyzer module 322 for continuous monitoring.

The data analyzer module 322 is configured for predicting measurement data of the state variables of each invariant using the behavioural models and the historical measurement data of the respective state variables. The predicted measurement data represents the expected or normal behaviour of the state variables. The data analyzer module 322 compares between the current measurement data and predicted measurement data of the state variables of each invariant. The data analyzer module 322 detects anomalies based on deviations between the current measurement data and predicted measurement data. The anomaly detection module 320 includes a responder module 324 that generates an alert if an anomaly is detected by the data analyzer module 322. This alert reports to the operator of the ICS 100 the anomaly together with the components that are likely under threat or attack. Further, through the analysis of deviations between the actual and predicted behaviours, semantics of the abnormal system state can be acquired by the operators for forensic analysis.

In many embodiments, the behavioural models include a first behavioural model 330 for each of the invariants governing only continuous state variables, and/or a second behavioural model 340 for each of the invariants governing both continuous and discrete state variables. Correspondingly, the machine modelling modules include a first machine modelling module 350 for constructing the first behavioural models 330, and/or a second machine modelling module 360 for constructing the second behavioural models 340. The first machine modelling module 350 may be referred to as "AiBox" and the second machine modelling module 360 may be referred to as "RuleBox".

The first behavioural model 330 models the behaviour of the continuous state variables of the respective invariant based on the interactions with dependent state variables to predict the time-dependent behaviour. The second behavioural model 340 models the behaviour of the continuous and discrete state variables of the respective invariant, specifically the dependencies across the state variables, based on the non-linear correlation and behavioural patterns of the state variables in response to a given control signal.

In constructing the first behavioural models 330, the invariants that govern only the continuous state variables are assumed to be a regression problem. The first behavioural models 330 are constructed by the first machine modelling module 350 using a suitable machine learning algorithm, such as but not limited to a multilayer perceptron neural network (MLP). The construction of an exemplary first behavioural model 330 for the invariant INV 1.3 in FIG. 5 is described below.

The invariant INV 1.3 represents the dependency of the water level sensor LIT101 with the flow sensors FIT101 and FIT201 measuring the inflow and outflow rates, respectively. Accordingly, the value of LIT101 at time t can be estimated using its previous value LIT101($t-1$) and the current values of the inflow rate FIT101($t$) and outflow rate FIT201($t$). Further, as the transient state of MV101 impacts the process dynamics, the invariant INV 1.3 is modified according to Equation 9. $d_1$ and $d_2$ correspond to the time delay considered in the flow sensors FIT101 and FIT202, respectively, in order to measure a more accurate value of LIT101 at time t.

$$LIT101(t)=LIT101(t-1)+\eta[FIT101(t-d_1)-FIT201(t-d_2)]$$ Equation 9

However, practically deriving the relationship among the state variables in Equation 9 is a complex task due to the existence higher order and non-linear correlations. Further, the heterogeneous nature of the state variables with different operational range complicates the modelling process. To overcome such complexity, a data-centric approach using machine learning algorithms such as MLP is adopted for automated feature learning using a training dataset 314 comprising the historical measurement data. A non-linear transformation function f(.) is defined in Equation 10 to estimate the measurement value of a continuous state variable.

$$LIT101(t)=f(LIT101(t-1),FIT101(t-d_1),FIT201(t-d_2))$$ Equation 10

In some embodiments, Equation 10 is defined using a neural network such as MLP. Using the training dataset 314, the first machine modelling module 350 receives the values of independent state variables as inputs to the MLP neural network and trains the first behavioural model 330 to predict the value of the dependent state variable with minimal error.

With reference to FIG. 4B, the first machine modelling module 350 includes a model generator module 352 for training a plurality of MLP models using the historical measurement data of the respective state variables of each invariant and by varying hyperparameters of the MLP neural network. The model generator module 352 generates the MLP models by varying the hyperparameters such as number of hidden layers, hidden units, learning rate, momentum, and activation functions. The hyperparameters may be varied or fine-tuned using a grid search algorithm. The model generator module 352 then trains the MLP models using the historical measurement data contained in the training dataset 314.

The first machine modelling module 350 further includes a model pruner module 354 for pruning the MLP models and selecting the best MLP model for the invariant. More specifically, the a model pruner module 354 calculates, for each MLP model, a statistical score based on actual and predicted measurement data of the respective state variables derived from the historical measurement data and the MLP model. The statistical scores may be calculated using Theil's U1 Statistic (TU1) as shown in Equation 11, where x(t) and $\hat{x}$(t) are the actual and predicted value of the state variable at $t^{th}$ timestamp, k is the number of samples, and $H_p$ denotes the set of hyperparameters. The model pruner module 354 then selects the MLP model with the minimum statistical score as the first behavioural model 330, i.e. the best MLP model, for the invariant.

$$TU1 = \frac{\sqrt{\left[\sum_{t=1}^{k}(\hat{x}(t)-x(t))^2\right]}}{\left[\sum_{t=1}^{k}(x(t))^2\right]}; wrtH_p$$ Equation 11

The selected first behavioural model 330 is used to predict the measurement data that is compared against the actual current measurement data for detecting anomalies based on deviations between the current and predicted measurement data. These deviations may also be referred to as residuals. During normal operation of the ICS 100, there would be slight deviations which would be detected as anomalies but are likely to be false positives. The computed deviations should be within an acceptable range r to minimize the occurrence of false positives, such that only deviations outside of the acceptable range will be detected as anomalies. As the performance of the anomaly detection system 300 is sensitive to the acceptable range for the deviations, a poor choice of the acceptable range might lead to an unacceptable number of either false positives or false negatives.

In some embodiments, constructing the first behavioural model for each invariant further includes calculating the acceptable range for the deviations based on a statistical distribution of historical deviations, wherein the historical deviations are derived from the historical measurement data from normal operation of the ICS 100. The historical deviations or residuals r(t) are generated as a sequence of random variables. However, during an attack, there would be non-random dynamics in these variables which can be effectively characterised through a statistical technique.

The first machine modelling module 350 may include a scorer module 356 for analyzing the statistical distribution of historical deviations to thereby calculate the acceptable range. In one embodiment, this analysis is done using a cumulative sum control chart (CUSUM) technique. CUSUM is a stateful approach that computes the cumulative sum of the residual sequence to detect discrepancies in their magnitudes. The upper control limit (UCL) and lower control limit (LCL) are defined in Equations 12 and 13 for calculating the acceptable level of positive and negative side deviations of the residual sequence, i.e. the upper and lower limits of the acceptable range for the deviations.

$$UCL=\text{Max}(P(t))$$ Equation 12

$$LCL=\text{Min}(N(t))$$ Equation 13

$$P(t)=\text{Max}(0,r(t)-\tau-b)\forall t, 1\leq t\leq T$$ Equation 14

$$N(t)=\text{Min}(0,r(t)-\tau-b)\forall t, 1\leq t\leq T$$ Equation 15

P(t) and N(t), expressed in Equations 14 and 15, P(t) and N(t) are the allowable positive and negative side deviations, respectively, in the acceptable range r, and b corresponds to the allowable slack. The anomaly detection module 320 is configured to detect anomalies when the probability of a deviation is greater than a predefined threshold computed from r(t), i.e. when P(t) is more than UCL or N(t) is less than LCL.

During normal operation of the ICS 100, there may be a few short-term deviations due to operational discrepancies, sensor noises, and temporal glitches. Such deviations should not be accounted as anomalies since they are not due to cyberattacks. As shown in Equations 16 and 17, two additional parameters—a time window and an allowable number of deviations within the time window—may be introduced to minimize such false positives. In some embodiments, constructing the first behavioural model 330 for each invariant may further include determining the time window ($w_s$) and the allowable number of deviations ($c_s$) within the time window. An anomaly function a(t) detects an anomaly at time t when the number of deviations in the time window exceed the allowable number.

$$f(t) = \begin{cases} 1, & (r(t) > UCL, \text{ or } r(t) < LCL) \\ 0, & \text{otherwise} \end{cases}$$ Equation 16

-continued $$a(t) = \begin{cases} \text{Anomaly}, & \left(\prod_{t=1}^{w_s} f(t)\right) > c_s \\ \text{Normal}, & \text{otherwise} \end{cases} \quad \text{Equation 17}$$

In constructing the second behavioural models 340, the invariants that govern both the continuous and discrete state variables are assumed to be a classification problem, since each discrete state variable have only two states. The second behavioural models 340 are constructed by the second machine modelling module 360 using a suitable machine learning algorithm, such as but not limited to a decision tree algorithm. With reference to FIG. 4B, the second machine modelling module 360 includes a rule generator module 362 for generating a plurality of rule models for the state variables of the invariant using the machine learning algorithm and the historical measurement data of the respective state variables. A sample of the rule models or conditions generated for the actuators 124 used in Stage 1 of the water treatment process 200 is shown in FIG. 7.

In one embodiment, a second behavioural model 340 is constructed for the invariant INV 1.1 in FIG. 5. The invariant INV 1.1 represents the dependency of the water level sensor LIT101 with the motorized valve MV101 connected to the inlet of the tank T101. More specifically, the rule generator module 362 generates several rule models or conditions for MV101 to be open or closed based on the LIT101 measurement data using the decision tree algorithm and the historical measurement data contained in the training dataset 314.

The second machine modelling module 360 further includes a rule pruner module 364 for pruning the rule models and selecting the best rule model for the invariant. More specifically, the rule pruner module 364 calculates a weight for each rule model and selects the rule model with the maximum weight as the second behavioural model 340, i.e. the best rule model, for the invariant. The selected second behavioural model 340 is used to predict the measurement data that is compared against the actual current measurement data for detecting anomalies based on deviations between the current and predicted measurement data.

In some situations, a few false positives may be observed while constructing the second behavioural model 340 representing the interrelationship across the flow sensor and its dependent motorized valve, as well as across the chemical property sensor and its dependent chemical dosing pump. The first case of the flow sensor and motorized valve is due to the transient state of the motorized valve. To minimize the false positives, constructing the second behavioural model 340 for the invariant may include determining a time delay before the deviations are detected as anomalies. In other words, an alert would be raised if the deviations are detected for longer than the time delay. The second case is due to the non-uniformity in the "on" time of the chemical dosing pump injecting the chemicals into the raw water. To minimize the false positives, the amount of chemicals injected is mapped with the "on" time of the chemical dosing pump, and then the generation of the rule models is carried out using information available in pump specifications.

The effectiveness of anomaly detection system 300 was assessed experimentally by designing and launching cyber-attacks in real-time against the operational SWaT plant. A cyberattack refers to a sequence of actions that influence the behaviour of one or more cyber- or physical components to alter the water treatment process 200. It is assumed that the primary objective of an attacker is to cause the underlying process to move into an undesirable state. The attacker is assumed to have complete access to the design specifications of each component of the plant under attack and thus can manipulate one or more sensor measurements without being detected. Such attacks are considered to be stealthy. The built-in safety mechanisms, such as mechanical breaker and alarm generator in the plant, are assumed to not have been activated by the attacker. The attacker is assumed to be able to compromise only a small subset of the sensors 122 and/or actuators 124 for launching coordinated multipoint attacks. The attacker is assumed to be able to assert complete control over the compromised PLCs 132, i.e. the firmware or the control codes of the PLCs 132 can be accessed and modified by the attacker in real-time. Further, the sensor measurements from the compromised PLCs 132 are considered legitimate and recorded in the data historian 146. The plant is assumed to be disconnected from other external network and the attacker is of the insider type.

As mentioned above, a cyberattack is a sequence of actions initiated against an operational plant with a motive to affect its state. An attack model can be represented as a three tuple $<A_{type}, A_{point}, A_{obj}>$ where, $A_{type}$ denotes the type of attack launched through the finite set of points ($A_{point}$) with an intention ($A_{obj}$). An attack type, for example, can be of any kind readily known to the skilled person. An attack point refers to the components compromised for launching the specific attack. The intention of the attacker ($A_{obj}$) can be specified as a statement such as "Damage Pump P101". The success of an attacker in realizing the intention depends on the effectiveness of the defense mechanisms utilized to protect the plant as well as the technical knowledge and proficiency of the attacker. In these experiments, the attackers are researchers who possess complete knowledge of the SWaT plant and thus the effectiveness of the anomaly detection system 300 is analyzed in terms of timely detection of attacks before the intention is realized.

Prior to the launch of an attack, the plant was brought to a steady state. No attacks were launched during the plant's transient state, i.e. during the startup or shutdown. The state of the plant is ensured by monitoring the quantity of water produced at various time instances and the absence of warnings related to water level sensors in the SCADA system 142. Further, to avoid the effect of one attack on another, a minimum interval of 5 minutes is maintained between successive attacks for the plant to stabilize from the impact of an attack. The procedure for launching attacks is described follows.

1. Identify the memory location of the target state variable where the PLC 132 receives the measurement data.
2. Compromise the link between the PLC 132 and corresponding sensor 122 for an attack on the Level 0 communication network.
3. Compromise the link between the PLC 132 and SCADA system 142 for an attack on the Level 1 communication network.
4. Generate an alert when the measurement data of a state variable is significantly different from the measurement data received by the PLC 132. Without an in-built attack detection logic in the PLC 132, the manipulated data is assumed to be the actual state while the control actions of the actuators 124 are initiated based on the manipulated data.

The experiments were conducted to evaluate the performance of the anomaly detection system 300 over selected existing anomaly detectors designed for the SWaT plant. The system 300 was implemented on a desktop-grade computer with using Python 3.7, Keras deep learning, and scikit-learn libraries, the same configuration system was used for all the experiments from constructing the behavioural models to testing on the live plant. This also shows the computational efficiency of the system 300 in running multiple behavioural models 330,340 concurrently on the desktop-grade computer for the detection of anomalies.

Two modes of evaluation were used in these experiments, namely static and live, to demonstrate the effectiveness of the anomaly detection system 300 against selected existing anomaly detectors. In the static evaluation mode, the experiments were based on measurement data previously collected from the SWaT plant under a set of 26 attacks listed in FIG. 8A. The collected measurement data may be referred to as the static dataset. In the live evaluation mode, the behavioural models were trained and the system 300 was evaluated using live measurement data recorded in the data historian 146 during live operation of the SWaT plant and under a set of 13 attacks listed in FIG. 8B.

In both evaluation modes, an attack is detected only when the alert is raised by the corresponding behavioural model constructed for an invariant that governs a particular state variable, or indirectly by its dependent state variable. For example, if there is no behavioural model constructed for an invariant that governs a different pressure indicator DPIT301. But an attack on DPIT301 will have a cascading effect on motorized valves MV301, MV302, MV303, or MV304, and pumps P301 or P302. When the alert is raised by the corresponding behavioural model monitoring these actuators 124, the attack is detected. If another behavioural model which monitors state variables unrelated to DPIT301 raises the alert, the attack is considered as a false positive.

In the static evaluation mode, the use of the static dataset is a traditional way of assessing the performance of anomaly detectors. Unlike in practical situations, the attacks last for a particular duration during which the measurement data can be collected for the theoretical experiments. Each measurement data record is a multivariate time series and is considered as a single data point. Anomaly detection is carried out for every time instance using a scoring technique, such as the detection rate expressed in Equation 18, to quantify the performance of the anomaly detectors based on the correctly detected anomalies. $T_p$ represents the number of correctly detected as anomalies and $F_n$ represents the number of incorrectly detected anomalies, i.e. anomalies that were incorrectly classified as "normal".

$$D_r = \frac{T_p}{T_p + F_n} \qquad \text{Equation 18}$$

The performance of the anomaly detection system 300 was compared against existing anomaly detectors that use machine learning algorithms such as Support Vector Machine (SVM), Deep Neural Network (DNN), 1D Convolutional Neural Network (1D-CNN), TABOR (a graphical model-based approach for anomaly detection), and an anomaly detection system based on Logical Analysis of Data (LAD-ADS). The static evaluation mode was conducted by launching the set of 26 attacks shown in FIG. 8A and the results are shown in FIG. 9A.

It was observed that the anomaly detection system 300 has an overall detection rate above 90% for the attacks against the actuators 124. This is due to the accurate modelling of interactions among the continuous and discrete state variables through the integration of design-centric (invariants) and data-centric (machine learning algorithms) by the machine modelling modules 350,360. Similarly, for attacks targeting the sensors 122, the overall detection rate was above 75% excluding the stealthy attacks in attack scenarios 3 and 16. These stealthy attacks were detected after they were removed, i.e. the plant moving from the attack state to normal state. The reason for the late detection of stealthy attacks is the rate at which the state variables are manipulated. As described above, the behaviour models that monitor the behaviour of the sensors 122 may be affected by additional parameters such as upper control limit (UCL), lower control limit (LCL), time window ($w_s$), and allowable number of deviations ($c_s$) within the time window. As the rate of change was minimal—for example the water level measured by LIT101 increased or decreased by 1 mm per second—the plant behaviour was assumed to be normal and no alert was raised after the attack launch and during the attack. However, once the attack has been removed, there was a notable difference in the behaviour of such sensors 122, and hence alerts were raised.

It was also observed that there were similar performances between the anomaly detection system 300 and the LAD anomaly detector in several attack scenarios because both operate over the interactions among the plant components for the anomaly detection process. However, in a few attack scenarios (7, 17, and 27), the anomaly detection system 300 dominated the LAD anomaly detector due to the inclusion of sensor behaviour in the system 300 that enables it to more effectively detect anomalies.

In the live evaluation mode, the anomaly detection process was conducted on the operational SWaT plant in real-time and this presented challenges unlike the static evaluation mode which used a static or benchmark dataset in a simulated environment. Attackers in the live evaluation mode make use of several strategies to prevent the early detection to achieve their intention. The live evaluation mode was conducted in two sub-modes to evaluate the performance of the anomaly detection system 300. The first sub-mode was conducted by operating the plant in normal conditions to evaluate the performance of the system 300 in terms of false positives. The second sub-mode was conducted by launching the set of 13 attacks shown in FIG. 8B against the plant in real-time to evaluate the performance of the system 300 in terms of attack detection time.

The performance of the anomaly detection system 300 was compared against existing anomaly detectors such as the design-centric Distributed Attack Detector (DAD) and an earlier MLP-based data-centric anomaly detector that operates over temporal dependencies of state variables.

The SWaT plant has several modes of operation that are frequently shifted based on operational and domain constraints and service demands. For example, there can be different operation modes for public holidays and normal days. Such dynamic nature affects the behaviour of the plant components which has a considerable impact on the underlying process dynamics. For example, the chemical dosing pump in a water treatment plant will be operated at a variable speed based on the pH value of incoming raw water. Such changes in the process dynamics cannot be accounted as anomalies. An anomaly detector that adheres to the dynamic operational characteristics of the SWaT plant should not generate alarms during the state changes that occurred during operation mode shifts.

In the first sub-mode for evaluation in terms of false positives, the SWaT plant was operated continuously for 2 hours under normal conditions. The SWaT plant was operated initially in automated mode with a default set of configurations. Subsequently, it was shifted to the manual mode by increasing the water storage capacity of the UF feed tank T301 from 800-1000 mm to 250-1000 mm. The results from this first sub-mode are shown in FIGS. 9B and 9C.

It was observed from FIG. 9B that none of the anomaly detectors raised false alarms, i.e. there were no false positives, during operation of the SWaT plant in automated mode. During operation of the SWaT plant in manual mode, the MLP-based anomaly detector had a false positive rate of 0.87%.

Figure 9C:
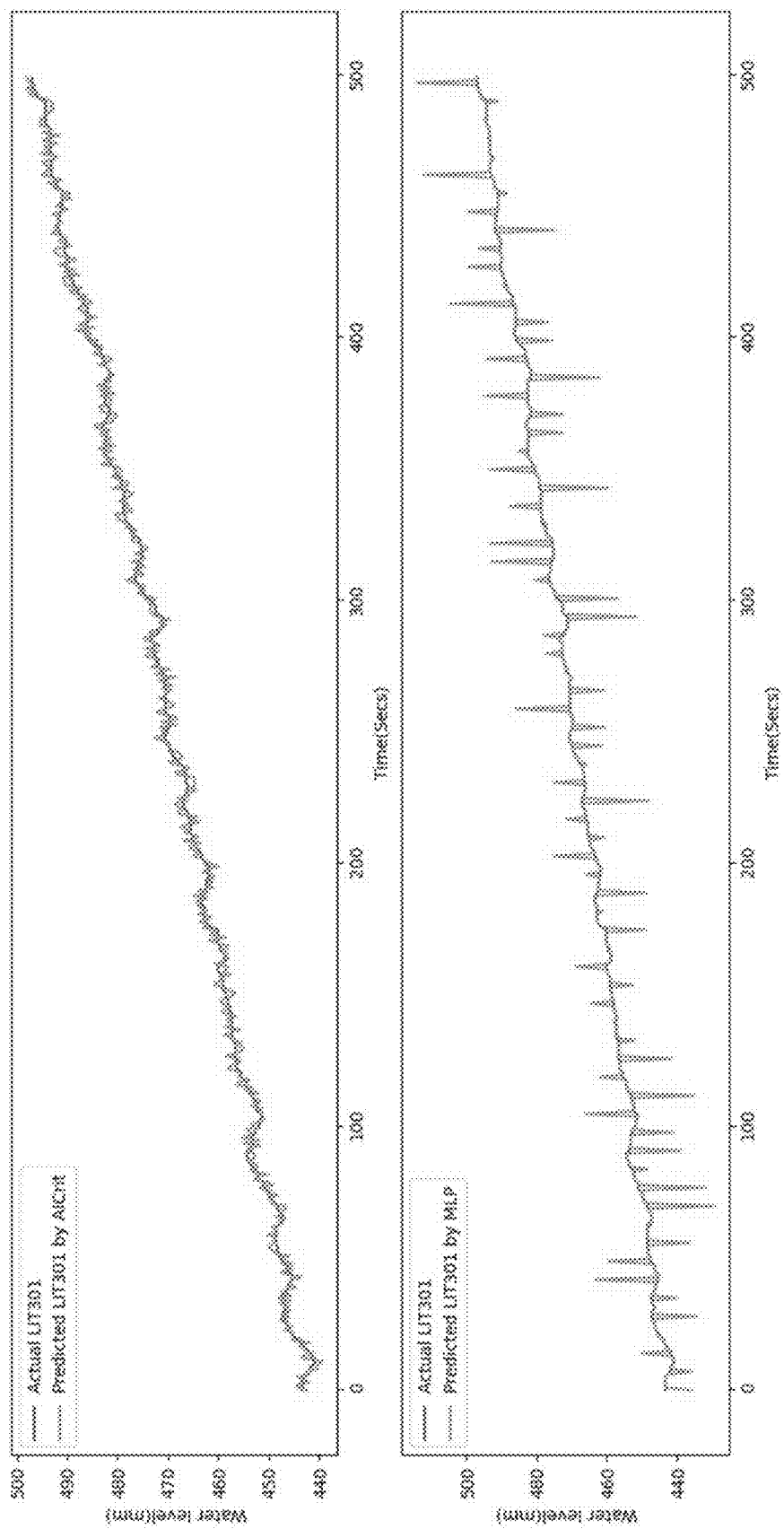

It was observed from FIG. 9C that there were abnormal spikes in the performance of the MLP-based anomaly detector in the manual mode that were absent for the anomaly detection system 300 also operating in the manual mode. The abnormal spikes were correspond to the false alarms from the MLP-based anomaly detector and had occurred due to the nature of its training dataset which has LIT301 sensor values in the range 800-1000 mm. As this range was altered to 250-1000 mm during the shift to the manual mode, false alarms were generated due to a lack of behavioural patterns for the altered range.

These abnormal spikes were absent for the anomaly detection system 300 because it has incorporated design knowledge in the form of the invariants. Although the range was altered, the dependency of LIT301 and its correlated state variables is retained in the plant by design. Thus, the anomaly detectors with design knowledge, i.e. the system 300 and DAD, did not generate any false alarms. Another reason for the zero false positive rate of the system 300 is careful tuning of the parameters described above for the construction of the first behavioural models 330 as well as considering the effect of the transient state of actuators 124 on the continuous state variables. Further, the residual sequence generated during the normal plant operation was close to zero. This shows that the behavioural models constructed in the system 300 are able to estimate the system state closer to the actual system state.

In the second sub-mode for evaluation in terms of attack detection time, the 13 attacks as shown in FIG. 8B were launched against the SWaT plant at different time instances and the results are shown in FIG. 9D.

It was observed that 11 out of the 13 attacks were successfully detected by the anomaly detection system 300, but the attacks under scenarios A1.1 and A6.1 were not detected by the system 300. This was because both attacks were designed to exploit the vulnerabilities in the SCADA workstation 144 to monitor the status of LIT101 and P101, and the attacks do not have any physical impact in the water treatment process 200 flow in the SWaT plant.

It was also observed from the successfully detected attacks both single-point and multi-point attacks were detected at a faster rate—approximately 2 to 32 seconds from attack launch—before the attacker's intention was achieved. Single-point attacks of constant type were detected in less than 10 seconds while it took 32 seconds to detect multi-point attacks against the Stage 1 components. Generally, the detection of stealthy multi-point attacks is challenging as the attacker compromises or spoofs more than one other state variable to avoid the detection. For example in attack scenario A5, the attacker attempted to flood tank T101 by compromising valve MV101 and flow sensor FIT101. Initially, during attack launch, there was no significant physical impact on plant operation. However, after 32 seconds from the attack launch, when the water level of tank T101 crossed H+50 mm, the alert was raised by the second behavioural model 340 that monitors the behaviour of valve MV101. There is a buffer above the H+50 mm level and the attacker intention was realised only when the water level crossed that buffer. Further, there is an alarm generator in case of tank overflow. Since the system 300 raised the alert before the actual tank overflow can happen, the attack was unsuccessful in realizing its intention.

The alerts on the anomalies were only raised by the behavioural models that monitor the targeted state variables or their correlated state variables. This enables localization of the anomalies and facilitates the plant operator to identify the components under threat as well as to locate the area of impact of an attack on the plant, especially if the plant is geographically dispersed. The plant operator or automated plant protection mechanisms can then take appropriate actions to mitigate the anomalies and prevent component damage.

The performance comparison of the anomaly detection system 300 against DAD and the MLP-based anomaly detector is shown in FIG. 9E. It was observed that the detection ability of the MLP-based anomaly detector is limited only to the continuous state variables since it operates over temporal dependencies. Further, due to a lack of design knowledge, the MLP-based anomaly detector had attack detection times that were much higher than DAD and the system 300. The system 300 requires more time compared to DAD, especially in detecting attacks against continuous state variables, because of the impact of the parameters introduced to minimize false positives due to temporal glitches. More importantly, the system 300 is able to avoid false positives and accurately detect the attacks in minimal time before the attacker's intention was achieved, indicating that the interactions among the sensors 122 and actuators 124 were learned effectively by the behavioural models.

Therefore, the anomaly detection system 300 described herein integrates a design-centric approach using the invariants together with a data-centric approach using the machine-learnt behavioural models to learn and model the spatiotemporal dependencies among plant components for accurate and timely detection of process anomalies. The experiments described above showed that the anomaly detection system 300 is able to effectively detect cyberattacks in minimal time and with zero or near-zero false positives, thus achieving improved performance in anomaly detections. Although the experiments were performed on the SWaT plant which is a scaled down water treatment plant, the experiment results are encouraging and the anomaly detection system 300 can be installed in larger commercial plants or ICS 100, such as city-scale water treatment plants. The system 300 can also be applicable for ICS 100 in other domains such as power, energy, and transportation.

In some embodiments, the anomaly detection system 300 continues to learn the plant behaviour in real-time during operation of the ICS 100. The behavioural models may include a primary set and an identical secondary set of behavioural models for each invariant. In one example, there is a primary first behavioural model 330 and a secondary first behavioural model 330 for the invariant 1.3. In another example, there is a primary second behavioural model 340 and a secondary second behavioural model 340 for the invariant 1.1. The pair of primary set and secondary set of behavioural models may be referred to as the "Twin Detector" system.

When the anomaly detection system 300 is deployed with the "Twin Detector" system, the current measurement data and the primary set of behavioural models are used by the anomaly detection module 320 to detect the anomalies. At the same time, the secondary set of behavioural models is trained by the machine modelling modules 350,360 using the current measurement data. Anomalies detected by the primary set of behavioural models are not learned by the secondary set of behavioural models. The secondary set of behavioural models is thus continuously trained with new measurement data in real-time while the primary set of behavioural models stagnates as they are being used to detect anomalies using real-time measurement data. The machine modelling modules 350,360 may replace the primary set of behavioural models (which are less mature) with the trained secondary set of behavioural models (which are more mature), and continue training of the secondary set of behavioural models. This replacement may be done at variable or predefined intervals, such as daily, weekly, or monthly, which may depend on plant operational demand. As more mature behavioural models are continually being deployed, the ability of the anomaly detection system 300 to detect anomalies is constantly improving, such that false positives can be further decreased towards zero and success rate of anomaly detection can be further increased.

In the foregoing detailed description, embodiments of the present disclosure in relation to a system 300 and method for detecting anomalies in an ICS 100 are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. An anomaly detection system for detecting anomalies in an industrial control system caused by cyberattacks on the industrial control system, the anomaly detection system comprising:
 a control system comprising a communication infrastructure, wherein the communication infrastructure includes a first communication network between a physical layer and a control layer, and a second communication network between the control layer and a supervisory control layer, wherein the physical layer comprises sensors and actuators, and wherein the control layer comprises system controllers;
 a data pre-processor module configured for:
  determining state variables of the industrial control system based on a system design of the industrial control system, the state variables comprising continuous state variables and discrete state variables, wherein the state variables represent measurable attributes of physical components in the industrial control system;
  determining invariants governing the state variables based on the system design, wherein the invariants define conditions that must hold based on the physical relationships among the state variables during normal operation of the industrial control system; and
  receiving historical measurement data of the state variables of each invariant from the industrial control system, wherein the historical measurement data is obtained from the sensors in the industrial control system; and
  receiving current measurement data of the state variables during operation of the industrial control system, wherein the current measurement data is obtained from the sensors in the industrial control system;
 a set of machine modelling modules configured for:
  constructing a set of behavioural models for each invariant using a set of machine learning algorithms and the historical measurement data of the respective state variables of the invariant, the behavioural models representing normal behaviour of the respective state variables during normal operation of the industrial control system, the behavioural models comprising:
   a first behavioural model for each of the invariants governing only the continuous state variables, the first behavioural models constructed using a neural network to model the normal behaviour of the continuous state variables of the respective invariant based on interactions among the continuous state variables; and
   a second behavioural model for each of the invariants governing both the continuous and discrete state variables, the discrete state variables associated with states of the actuators in the industrial control system, the second behavioural models constructed using a classification algorithm to model the normal behaviour of the continuous and discrete state variables of the respective invariant based on interactions among the continuous and discrete state variables,
  wherein said constructing the first behavioural model for each invariant comprises:
   training a plurality of neural network models using the historical measurement data of the respective state variables and by varying hyperparameters of the neural network;
   calculating, for each neural network model, a statistical score based on actual and predicted measurement data of the respective state variables derived from the historical measurement data and the neural network model; and
   selecting the neural network model with the minimum statistical score as the first behavioural model for the invariant; and
 an anomaly detection module configured for:
  predicting, using the first behavioural models and the current measurement data of independent continuous state variables as inputs to the first behavioural models, output measurement data of dependent continuous state variables that are dependent on the independent continuous state variables;
  predicting, using the second behavioural models and the current measurement data of the discrete state variables as inputs to the second behavioural models, output measurement data of the continuous state variables of which the discrete state variables are dependent on;
  detecting anomalies based on deviations between the current measurement data and predicted measurement data of the dependent continuous state variables from the first behavioural models; and
  detecting anomalies based on deviations between the current measurement data and predicted measurement data of the continuous state variables from the second behavioural models,
wherein the detected anomalies indicate attacks on the first communication network between the control layer and the sensors, or attacks on the second communication network between the control layer and the supervisory control layer, wherein the attacks are detected through deviations in the state variables caused by compromised communication links; and
wherein the behavioural models are further configured to model operational discrepancies caused by transient states of the actuators when the actuators change states, thereby improving detection of the anomalies.

2. The anomaly detection system according to claim 1, wherein the neural network for constructing the first behavioural models comprises a multilayer perceptron neural network, and wherein said constructing, by the first machine modelling module, the first behavioural model for each invariant comprises:
training a plurality of multilayer perceptron models using the historical measurement data of the respective state variables and by varying hyperparameters of the multilayer perceptron neural network;
calculating, for each multilayer perceptron model, a statistical score based on actual and predicted measurement data of the respective state variables derived from the historical measurement data and the multilayer perceptron model; and
selecting the multilayer perceptron model with the minimum statistical score as the first behavioural model for the invariant.

3. The anomaly detection system according to claim 1, wherein constructing, by the first machine modelling module, the first behavioural model for each invariant further comprises calculating an acceptable range for the deviations based on a statistical distribution of historical deviations.

4. The anomaly detection system according to claim 3, wherein constructing, by the first machine modelling module, the first behavioural model for each invariant further comprises analysing the statistical distribution of historical deviations using a cumulative sum control chart technique to thereby calculate the acceptable range.

5. The anomaly detection system according to claim 1, wherein constructing, by the first machine modelling module, the first behavioural model for each invariant further comprises determining a time window and an allowable number of deviations within the time window.

6. The anomaly detection system according to claim 1, wherein the classification algorithm for constructing the second behavioural models comprises a decision tree algorithm, and wherein said constructing, by the second machine modelling module, the second behavioural model for each invariant comprises:
generating a plurality of rule models for the state variables of the invariant using the decision tree algorithm and the historical measurement data of the respective state variables;
calculating a weight for each rule model; and
selecting the rule model with the maximum weight as the second behavioural model for the invariant.

7. The anomaly detection method according to claim 6, wherein constructing, by the second machine modelling module, the second behavioural model for each invariant further comprises determining a time delay before the deviations are detected as anomalies.

8. The anomaly detection system to claim 1, further comprising a twin detector system, the twin detector system comprising a primary set of the behavioural models and an identical secondary set of the behavioural models for each invariant.

9. The anomaly detection system according to claim 8, wherein:
the anomaly detection module is configured for detecting the anomalies using the primary set of behavioural models and the current measurement data during operation of the industrial control system; and
the machine modelling modules are configured for training the secondary set of behavioural models using the current measurement data.

10. The anomaly detection system according to claim 9, wherein the machine modelling modules are configured for:
replacing the primary set of behavioural models with the trained secondary set of behavioural models; and
continuing training of the secondary set of behavioural models.

11. A computerized anomaly detection method for detecting anomalies in an industrial control system caused by cyberattacks on the industrial control system, wherein the industrial control system comprises a communication infrastructure, wherein the communication infrastructure comprises a first communication network between a physical layer and a control layer, and a second communication network between the control layer and a supervisory control layer, wherein the physical layer comprises sensors and actuators, and wherein the control layer comprises system controllers, the anomaly detection method comprising:
determining state variables of the industrial control system based on a system design of the industrial control system, the state variables comprising continuous state variables and discrete state variables, wherein the state variables represent measurable attributes of physical components in the industrial control system;
determining invariants governing the state variables based on the system design, wherein the invariants define conditions that must hold based on the physical relationships among the state variables during normal operation of the industrial control system;
receiving historical measurement data of the state variables of each invariant from the industrial control system, wherein the historical measurement data is obtained from the sensors in the industrial control system;
constructing a set of behavioural models for each invariant using a set of machine learning algorithms and the historical measurement data of the respective state variables of the invariant, the behavioural models representing normal behaviour of the respective state variables during normal operation of the industrial control system, the behavioural models comprising:
a first behavioural model for each of the invariants governing only the continuous state variables, the first behavioural models constructed using a neural network to model the normal behaviour of the continuous state variables of the respective invariant based on interactions among the continuous state variables, wherein constructing the first behavioural model for each invariant comprises:
training a plurality of neural network models using the historical measurement data of the respective state variables and by varying hyperparameters of the neural network;

calculating, for each neural network model, a statistical score based on actual and predicted measurement data of the respective state variables derived from the historical measurement data and the neural network model; and selecting the neural network model with the minimum statistical score as the first behavioural model for the invariant; and a second behavioural model for each of the invariants governing both the continuous and discrete state variables, the discrete state variables associated with states of the actuators in the industrial control system, the second behavioural models constructed using a classification algorithm to model the normal behaviour of the continuous and discrete state variables of the respective invariant based on interactions among the continuous and discrete state variables;

receiving current measurement data of the state variables during operation of the industrial control system, wherein the current measurement data is obtained from the sensors in the industrial control system;

predicting, using the first behavioural models and the current measurement data of independent continuous state variables as inputs to the first behavioural models, output measurement data of dependent continuous state variables that are dependent on the independent continuous state variables;

predicting, using the second behavioural models and the current measurement data of the discrete state variables as inputs to the second behavioural models, output measurement data of the continuous state variables of which the discrete state variables are dependent on;

detecting anomalies based on deviations between the current measurement data and predicted measurement data of the dependent continuous state variables from the first behavioural models; and detecting anomalies based on deviations between the current measurement data and predicted measurement data of the continuous state variables from the second behavioural models, wherein the detected anomalies indicate attacks on the first communication network between the control layer and the sensors, or attacks on the second communication network between the control layer and the supervisory control layer, wherein the attacks are detected through deviations in the state variables caused by compromised communication links; and wherein the behavioural models are further configured to model operational discrepancies caused by transient states of the actuators when the actuators change states, thereby improving detection of the anomalies.

12. The anomaly detection method according to claim 11, wherein the neural network for constructing the first behavioural models comprises a multilayer perceptron neural network, and wherein constructing the first behavioural model for each invariant comprises:

training a plurality of multilayer perceptron models using the historical measurement data of the respective state variables and by varying hyperparameters of the multilayer perceptron neural network;

calculating, for each multilayer perceptron model, a statistical score based on actual and predicted measurement data of the respective state variables derived from the historical measurement data and the multilayer perceptron model; and selecting the multilayer perceptron model with the minimum statistical score as the first behavioural model for the invariant.

13. The anomaly detection method according to claim 11, wherein constructing the first behavioural model for each invariant further comprises calculating an acceptable range for the deviations based on a statistical distribution of historical deviations.

14. The anomaly detection method according to claim 13, wherein constructing the first behavioural model for each invariant further comprises analysing the statistical distribution of historical deviations using a cumulative sum control chart technique to thereby calculate the acceptable range.

15. The anomaly detection method according to claim 11, wherein constructing the first behavioural model for each invariant further comprises determining a time window and an allowable number of deviations within the time window.

16. The anomaly detection method according to claim 11, wherein the classification algorithm for constructing the second behavioural models comprises a decision tree algorithm, and wherein constructing the second behavioural model for each invariant comprises:

generating a plurality of rule models for the state variables of the invariant using the decision tree algorithm and the historical measurement data of the respective state variables;

calculating a weight for each rule model; and selecting the rule model with the maximum weight as the second behavioural model for the invariant.

17. The anomaly detection method according to claim 16, wherein constructing the second behavioural model for each invariant further comprises determining a time delay before the deviations are detected as anomalies.

18. The anomaly detection method according to claim 11, wherein the behavioural models comprise a primary set and an identical secondary set of behavioural models for each invariant.

* * * * *